US008818550B2

(12) United States Patent
Zumbrunn et al.

(10) Patent No.: US 8,818,550 B2
(45) Date of Patent: Aug. 26, 2014

(54) HORIZONTAL CIRCUIT STORAGE SYSTEM

(75) Inventors: Werner Zumbrunn, Muttenz (CH); Stefan Kobler, Neuendorf (CH); Gregor Burkhard, Olten (CH); Norbert Bouche, Landau (DE); Jurgen Gotz, Graben-Neudorf (DE); Rene Talon, Hergersweiler (DE)

(73) Assignee: Bellheimer Metallwerk GmbH, Bellheim (DE)

( * ) Notice: Subject to any disclaimer, the term of this patent is extended or adjusted under 35 U.S.C. 154(b) by 1848 days.

(21) Appl. No.: 11/992,501

(22) PCT Filed: Jun. 22, 2006

(86) PCT No.: PCT/EP2006/005982
§ 371 (c)(1),
(2), (4) Date: Dec. 12, 2008

(87) PCT Pub. No.: WO2007/036250
PCT Pub. Date: Apr. 5, 2007

(65) Prior Publication Data
US 2010/0114362 A1   May 6, 2010

(30) Foreign Application Priority Data

Sep. 29, 2005   (DE) .................. 10 2005 046 821
Apr. 21, 2006   (DE) .................. 20 2006 006 666 U

(51) Int. Cl.
*G06F 7/00* (2006.01)
*B65G 1/133* (2006.01)
(52) U.S. Cl.
CPC ..................................... *B65G 1/133* (2013.01)
USPC ......................................... 700/218; 700/230
(58) Field of Classification Search
USPC ................................................. 700/218, 230
See application file for complete search history.

(56) References Cited

U.S. PATENT DOCUMENTS 6,321,138 B1 * 11/2001 Livesay et al. ................. 700/245
6,714,834 B1 * 3/2004 Roth et al. ..................... 700/217

FOREIGN PATENT DOCUMENTS

| CH | 557 280 | 12/1974 |
|----|---------|---------|
| DE | 1 929 141 | 12/1970 |
| DE | 39 20 405 C1 | 3/1990 |
| DE | 196 24 177 A1 | 1/1998 |
| DE | 196 35 026 A1 | 3/1998 |
| GB | 1516120 | 6/1978 |
| WO | WO 2004087543 | 10/2004 |

* cited by examiner

*Primary Examiner* — Ramya Burgess
(74) *Attorney, Agent, or Firm* — Mark P. Stone

(57) ABSTRACT

The invention relates to a horizontal circuit storage system (1) for storing storage goods carried by load-carriers. The horizontal circuit storage system has a storage zone (2) with a plurality of stacked horizontal storage planes (5). A plurality of load-carriers (6) are arranged in a row in each of the storage planes. The storage zone (2) is located between two vertical conveyers (3, 4) which interconnect the storage planes vertically in each case. The load-carriers (6) can be moved horizontally in the storage planes (5) to the vertical conveyers (3, 4) by horizontal conveyers (8) which are associated each with a storage plane (5). According to the invention, a control unit is provided in order to permit faster access to individual load-carriers and, depending on a control signal from the control unit, the storage system can be brought into a condition in which a horizontal circuit is formed for the load-carriers (6). The invention also relates to a method for accessing a particular load-carrier (6) which receives a storage good in a horizontal circuit storage system (1) in which such a horizontal circuit (65) is formed.

31 Claims, 16 Drawing Sheets

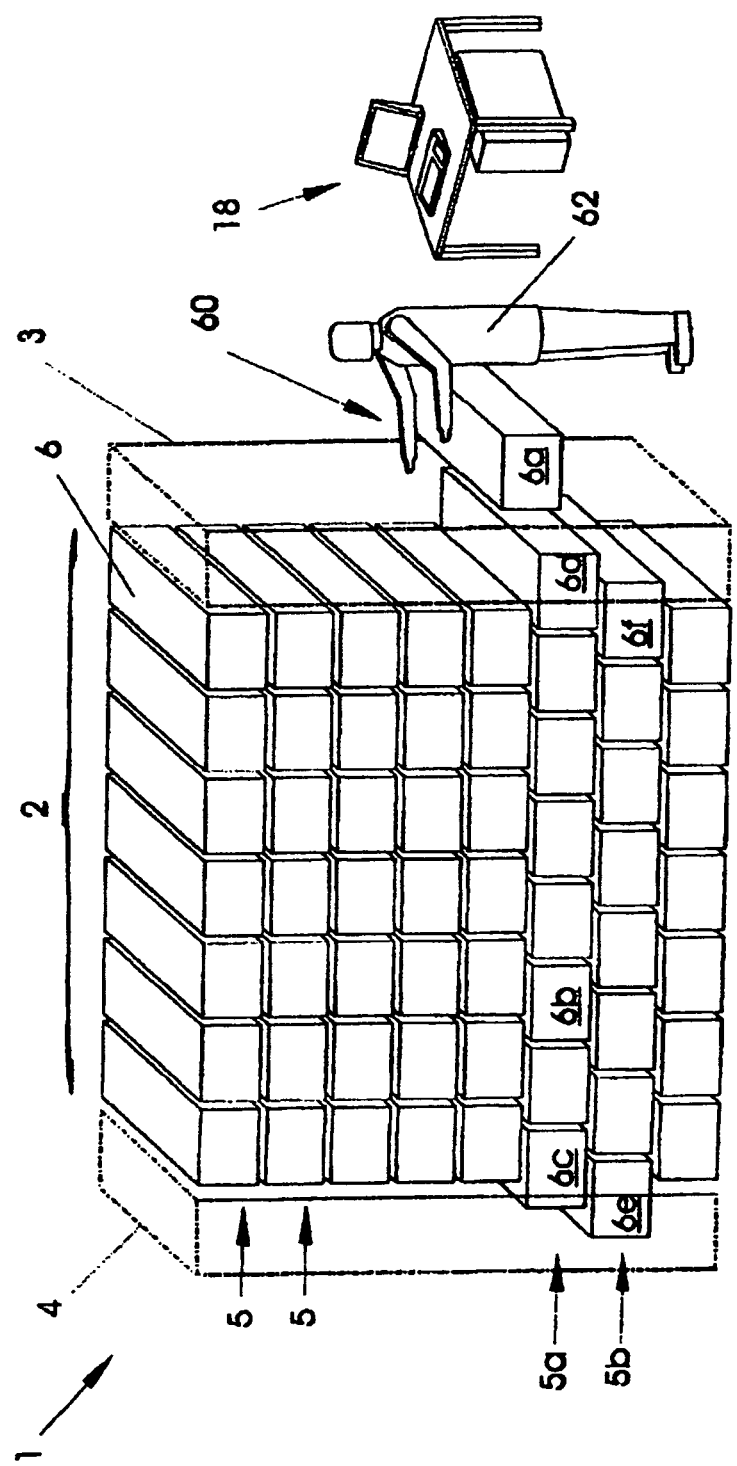

HORIZONTAL CIRCUIT STORAGE SYSTEM

Figure 1:
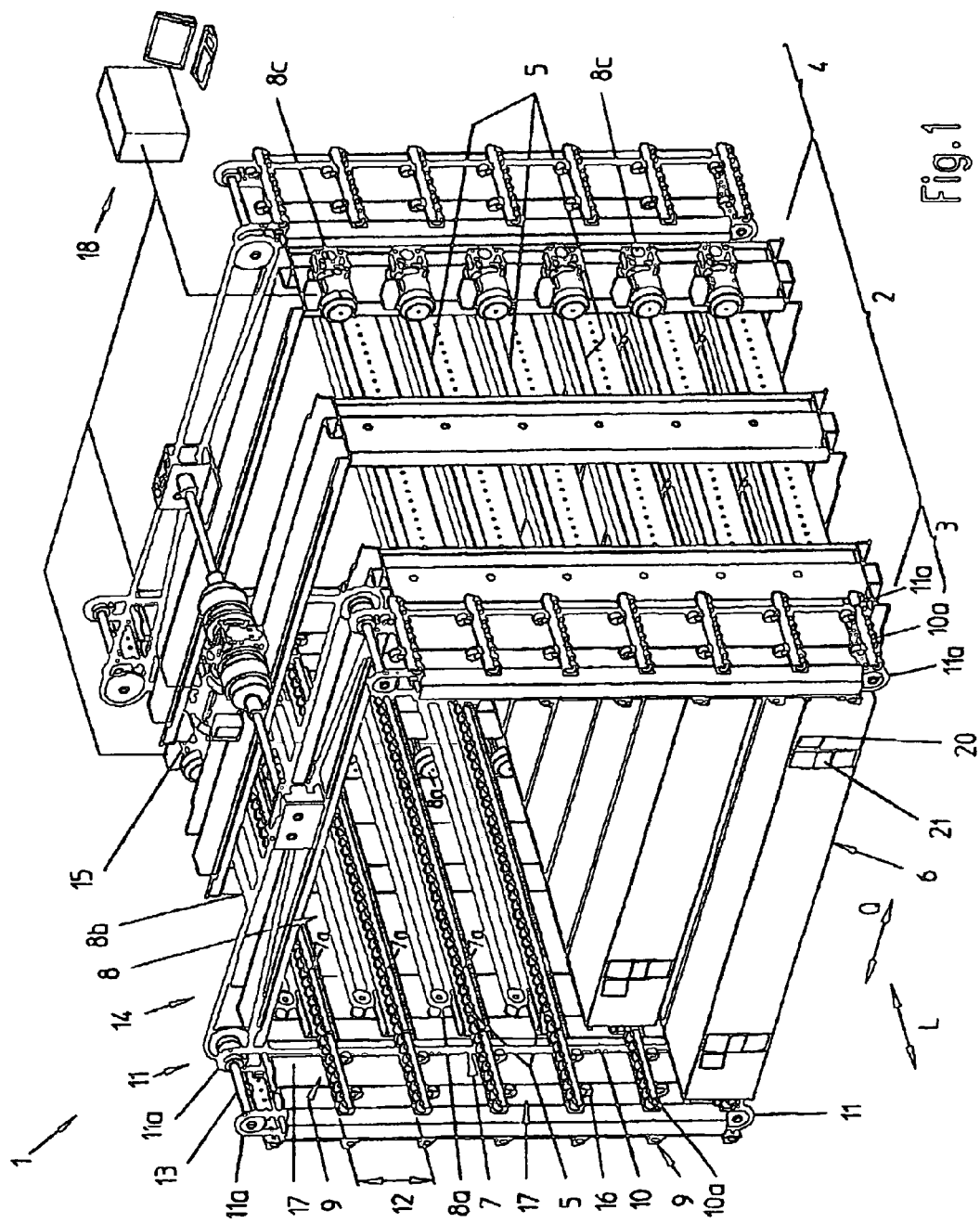

The invention relates to a horizontal circuit storage system for storing storage goods carried by load-carriers, said horizontal circuit storage system having a storage zone with a plurality of stacked horizontal storage planes, each of which has a plurality of load-carriers arranged in a row, and said horizontal circuit storage system also having at least two vertical conveyers, whereby the storage zone is located between the vertical conveyers which interconnect the storage planes in a vertical direction, and horizontal conveyers, which are associated each with a storage plane and by which the load-carriers are movable in the storage planes in the direction of the vertical conveyers. The invention furthermore relates to a method for accessing a specified load-carrier in a horizontal circuit storage system, the load carrier being adapted to hold storage goods and being destined to be delivered, wherein with the method, the load-carriers are moved for loading and/or unloading, one behind the other in respective stacked storage planes and, by means of a vertical conveyer, the specified load-carrier that is destined to be delivered is conveyed to a delivery station.

A horizontal conveyer in this arrangement and with this mode of operation is known, for example, from DE 101 57 121 A1. In this publication a storage and material flow system is shown and described in which a storage rack with a plurality of rack storage places arranged one behind the other is arranged between a paternoster system and a rear supporting unit. The paternoster system there is intended for fast regrouping of the storage goods located in the flow rack.

For practical application, however, the utilisation factor of the storage system of DE 101 57 121 A1 is too low, because the rear supporting unit and the paternoster system together take up too much space that cannot be used for storage. Furthermore, in the storage system given in DE 101 57 121 A1, fast access is guaranteed only if the paternoster-system allows fast circulation of the load-carriers. The design of such a fast-running paternoster system is, however, very complex, particularly if the storage goods are heavy.

A similar storage system is known from DE 199 35 742 A1. In the case of this storage system, a buffer storage area, in the form of a paternoster system, is arranged in front of the storage zone. A storage control device in the form of a traverse runs horizontally above the storage zone. For practical applications, particularly in modern automated storage areas, the access times required for this system to any particular storage point within the storage zone are too long.

Finally, from DE 40 33 184 A1, a storage system is known in which each of the individual storage planes is a part of a paternoster system. The storage goods are placed into and removed from storage side by side in the storage planes. The storage planes circulate with the paternoster. It is difficult to adjust this system to various storing requirements, and the access times for use in fully automated facilities are also too long.

The object of the invention is therefore to improve a storage system of the type mentioned at the beginning in such a way that there can be fast and automated access to any given storage point with good utilisation of space.

According to the invention, this object is solved for the horizontal circuit storage system of the type mentioned at the beginning in that a control unit is provided that can bring the storage system into a condition in which two storage planes, forming one pair, and the two vertical conveyers, forming another pair, are driven, with the members of each pair being driven in opposite directions, so that they form a horizontal circuit for the load-carriers across the two storage planes and the vertical conveyers.

This solution has the advantage that the horizontal circuit, which can be formed at any point in the storage zone, results in fast access to any particular load-carrier, in the storage zone. Placing storage goods into storage and retrieving them from storage can consequently be automated more simply and faster. In particular, the horizontal circuit storage system designed according to the invention is suitable for a chaotic storage system in which the control unit carries out the assignment of goods to a load-carrier. The storage planes are in particular stationary, i.e., unmovable vertically.

According to the invention, the above object is furthermore solved for the method mentioned at the beginning in that a horizontal circuit of load-carriers of any two storage planes of the storage zone is formed by having the load-carriers circulate essentially horizontally through the two storage planes, each plane moving in the opposite direction of the other, and circulate essentially vertically, in opposite directions at the two ends of the storage planes, until the vertical conveyer can access the particular load-carrier. At the delivery station, the load-carrier is ready for access from outside the storage system, so that storage goods can be placed into the load-carrier or removed from the load-carrier at this point.

The solution according to the invention can be further improved by a number of mutually independent enhancements, each of which is inventive in itself, whereby these enhancements can be combined with one another in any manner. These enhancements are described in the following.

In order to establish the horizontal circuit at any given point in the storage zone with any given storage planes, it is advantageous if each storage plane has its own separate drive, which is preferably adapted to be activated independently of the drives of the other respective storage planes. Although it would also be possible to couple the horizontal conveyers of multiple storage planes, for example, pairs, to a single drive, complex coupling and gearing circuits would then be necessary for the movement in opposite directions of any combinations of storage planes in order to produce a horizontal circuit. This effort can, however, be avoided in an embodiment having a simple design if the at least one pair of horizontal conveyers driving storage planes forcibly couples the storage planes to one another mechanically. For example, such forced coupling can be implemented by means of a circulating traction drive, whereby one span or strand of this drive is associated with one storage plane of the at least one pair.

Maintenance is often costly in the case of storage systems, which are often operated over very long periods of time. In order to simplify access to the drive systems and therefore to simplify the maintenance, an advantageous embodiment provides for the drive components of the horizontal conveyers and the vertical conveyers to be arranged together on one side surface of the horizontal circuit system, preferably one above the other. In this embodiment, it is only necessary for one side of the horizontal circuit system to be accessible in order to maintain the drive systems. If the drive systems are arranged one above the other, it is even sufficient to have access to a small section of the side surface, by having the drive components, for example, arranged in such a way as to be accessible from outside behind a maintenance panel that is arranged on the horizontal circuit storage system and that can be removed repeatedly.

It is furthermore advantageous if the number of load-carriers in the horizontal circuit storage system amounts to maximum N+n, where N is the number of load-carriers when the storage zone is fully equipped and n is the number of vertical conveyers in the horizontal circuit storage system. In the case of this maximum loading, it is still ensured that any given load-carrier can be moved along the shortest path to a delivery station at which the storage goods in this load-carrier can be accessed by operating personnel. If this number is exceeded, one load-carrier would have to be temporarily stored in the delivery station in order to guarantee continuously the shortest conveying paths for the load-carriers. This, however, would require an additional exchange of the load-carriers in the area of the delivery station or, if access to the storage goods in the temporarily stored load-carrier should be blocked for certain operating personnel, this would require a device which allows access to the storage goods in the delivery station only after verification of the access authorisation of the operating personnel.

The transport of load-carriers in the individual storage planes can be provided by drivers on the horizontal conveyers that are adapted to be driven in and out vertically in driver couplings on the load-carrier side. The driver can be mounted directly on a traction drive. Because they are adapted to be both driven in and out, this advantageous embodiment ensures that the load-carriers are also driven past the driver couplings in the vertical conveyers and consequently can pass the storage planes, so that they engage with and disengage from the driver couplings. To achieve this, the driver couplings on the load-carrier side must, for example, simply be formed as C-profiles open in a vertical direction. The distance between the load-carriers in the storage planes is determined by the distance between the drivers.

In particular, a pair of drivers can be assigned to each load-carrier. In this embodiment, the driver that is facing away from the vertical conveyer can push the load-carrier onto the vertical conveyer or the load-carrier can be pulled by it into the storage zone while the other driver is already decoupled. Correspondingly, the load-carriers can have two river couplings that are spaced apart from one another in the direction of the vertical conveyers. In an area where the storage planes border the vertical conveyer in which a load-carrier is moved from the storage plane into the vertical conveyer, a driver is held in the respective driver coupling facing away from the vertical conveyer.

The vertical conveyers can furthermore be provided with a locking means on at least one supporting surface on which the load-carriers lie in the vertical conveyer, whereby this locking means engages with a corresponding counter-locking means of the load-carrier in a transport position and secures the load-carrier against shifting in the vertical conveyer. The locking means can, in particular, be formed as a locking projection. Preferably the rollers or slide shoes supporting the load-carrier can be used as the counter-locking means. The locking means serves as a brake and protection against over-running when the load-carriers are moved from one storage plane into the vertical conveyer and back.

In a further embodiment which is likewise inventive in itself, in the case of the horizontal circuit system mentioned at the beginning, a separate horizontal conveyer is associated with at least a pair of storage planes and the load-carriers in the one storage plane of the pair are driven in the opposite direction of the load-carriers in the other storage plane of the pair.

In this embodiment, it is possible to achieve fast access to any given load-carrier without complex synchronisation of the drives of different storage planes. The two storage planes driven in opposite directions via the horizontal conveyer thereby form a horizontal paternoster.

It is furthermore advantageous if each of the two vertical conveyers has an independent drive. In particular, this embodiment makes it possible for the one vertical conveyer to convey to the delivery station the load-carrier that is destined to be delivered, while the other vertical conveyer already moves to the storage planes that form the horizontal circuit for the next load-carrier that is destined to be delivered. If there were a central drive for both vertical devices, it would be possible to implement such a movement only with complex couplings and gearings.

The synchronisation of the individual drives of the horizontal conveyers and/or the vertical conveyers can be brought about by the control unit or by means of mechanical coupling.

In the case of the storage system according to the invention, the vertical conveyers can, in particular, be formed so as to have a single shaft or single column, so that at any given time, movement is possible in only one direction at each end of the storage planes. This embodiment saves space that can be made available to the storage zone. The utilization of space is consequently more efficient.

In order to be able to process load-carriers of any width without major modifications to the basic structure of the horizontal circuit storage system, it is advantageous if the horizontal conveyers and/or the vertical conveyers each act on the load-carriers at the two lateral ends of the load-carriers located in the transverse direction. This can, for example, be achieved in a simple manner by mounting conveyers to each side wall of the horizontal circuit storage system, whereby these conveyers engage with the sides of the load-carriers. In this embodiment, the configuration of the side walls remains independent of the width of the load-carriers and the horizontal circuit storage system can be adapted to load-carriers of various widths by changing the distances between the side walls.

In a further advantageous embodiment, the individual storage planes can each be formed by a rail system, whereby the load-carriers of a storage plane are supported on the rail system of this storage plane in such a manner that they can be moved horizontally. A rail system makes possible a configuration of the horizontal circuit storage system with low material expenditures without substantial restrictions in the loads. The rails can, in particular, be arranged in pairs at either side of the storage zone, at the sides of the storage system, so that the load-carriers are supported on both side ends.

For a horizontally movable support of the load-carriers, the storage planes can, in particular, use rollers that, for example, can be formed on the rail system, whereby the rail system can comprise roller rails.

In an advantageous embodiment, the vertical conveyers can likewise have transport planes, for example, in the form of a rail system. The load-carriers can be transported vertically on the individual transport planes. In order to transfer the load-carriers from a storage plane to the vertical conveyer, the load-carrier in this embodiment only needs to be moved from a storage plane to the transport plane, which is particularly simple if rail systems are used. The rail system of the vertical conveyers can, in particular, correspond to the rail system of the storage planes and comprise, for example, roller rails. The transport planes can be coupled to one another in a manner that is rigid with respect to movement, in order to enable simultaneous transport of a plurality of load-carriers in a vertical direction.

The vertical conveyers can furthermore have a circulating traction drive, whereby the transport planes can be mounted to the traction mechanism. In particular, in the case of this embodiment, the transport planes can be formed by a plurality of rails mounted, one above the other, on the traction mechanism, whereby the distance between the rails in a vertical direction preferably corresponds to the distance between the rails in the storage planes. In this way, fast transport of the load-carriers is possible, particularly during the formation of the horizontal circuit, because all rails of the storage plane and the vertical conveyer are again aligned when the vertical conveyer moves by the storage plane distance. During the formation of the horizontal circuit, in which a load-carrier of one storage plane must be transported to another storage plane, the vertical conveyer must therefore be driven in only one direction without a reverse in movement, and does not have to drive back and forth between each of the storage planes involved in the horizontal circuit.

In order to be able to carry heavy loads on the vertical conveyers, the rails can be supported on rollers that run vertically on a support surface and that are arranged below the rails, whereby these rollers are pressed essentially in a horizontal direction onto the support surface as a result of a load on the rails. In particular, the support surface can be formed at the sides of the storage system by a running surface that runs vertically in the area of the vertical conveyers.

The transfer of load-carriers to the vertical conveyer between the storage planes and the transport planes can be simplified by providing the load-carriers with couplings by means of which the load-carriers of one storage plane are coupled to one another in a releasable manner and in a way that transfers a horizontal force. In this embodiment, the drive force for moving the load-carriers to any given position in the storage plane can be introduced into just a single load-carrier in order to move the load-carriers of one storage plane together. As a result of the coupling, the movement of a load-carrier is transferred to the remaining load-carriers in a storage plane. Via the remaining load-carriers, the coupled load-carriers found at the ends of the storage plane can each then be slid onto a transport plane of the vertical conveyer or be pulled therefrom and onto the storage plane.

In an advantageous further, embodiment, it is possible to use as the coupling for the load-carriers a mechanical coupling adapted to be released by a relative vertical movement between two load-carriers that are coupled to one another. This can be realised in a simple way in that a coupling shackle or fishplate, mounted on a load-carrier, engages behind a correspondingly formed coupling shackle or fishplate on the other load-carrier horizontally in the direction of the storage plane, by sliding the two coupling shackles or fishplates into one another in a vertical direction.

The horizontal conveyer can have a roller chain or a pair or plurality of roller chains mounted laterally to drive the load-carriers of a storage goods plane. To achieve this, the load-carriers can be provided with a coupling element that can engage in the roller chain. The coupling element can, for example, comprise a tooth profile that meshes with the roller chain. The use of a roller chain together with a coupling element on the side of the load-carrier has the advantage that the spacing between the load-carriers is pre-determined by the spacing between the rollers and by the tooth-work of the tooth profile. In this way, the load-carriers cannot move away from one another or hit against one another while they are engaged in the roller chain.

Furthermore, spacers can be provided on the load-carriers in order to set the spacing between load-carriers in a storage plane. If the spacers are manufactured from an elastically compressible material, impacts can be absorbed and damages to delicate storage goods can be avoided. The spacers are preferably provided with leading chamfers extending in a vertical direction in order to prevent collisions of the load-carriers located at the respective end of a storage plane with the load-carriers in the vertical conveyers.

During operation, one of the vertical conveyers conveys the load-carrier that is to be provided from its storage plane to the delivery station or from the delivery station to that storage plane which the control unit has determined for the load-carrier. In this process, a further load-carrier can already be delivered at the delivery station for loading or unloading while the load-carriers of two storage planes circulate in the horizontal circuit for access to the next load-carrier that is destined to be delivered next. This measure results in a further reduction of the access times.

For further reducing the access times, the load-carrier located at the delivery station can already be taken up by the vertical conveyer while the vertical conveyer conveys the load-carrier destined to be delivered next from its storage plane to the delivery station. Both of the load-carriers can thereby preferably be taken up in various storage planes. From this time, two load-carriers are transported simultaneously by the vertical conveyer. During the transport to the delivery station of the load-carrier that is to be delivered, the previous load-carrier is simultaneously transported away from the delivery station and is ready for placement into storage immediately after the handover to the delivery station of the load-carrier that is to be delivered. To accomplish this, the vertical conveyer must only transport the previous load-carrier to the storage goods plane determined for it. With the next horizontal circuit, the load-carrier is then fed into the storage zone.

For access to a new load-carrier that is to be delivered at the delivery station, the previous load-carrier is fed into the new horizontal circuit.

In order to carry out the horizontal circuit as quickly as possible, this circuit is preferably run through two storage goods planes one lying directly above the other.

The storage system is preferably given a number of load-carriers, which corresponds to at least the capacity of the storage zone, so that the storage zone is fully loaded. In addition, a further load-carrier can be temporarily stored in each vertical conveyer for forming a horizontal circuit. A further load-carrier can be temporarily stored for delivery at the delivery station or in the one vertical conveyer leading to the delivery station. Due to these additional load-carriers, the space occupied by the supply system can be better used.

In the following, the invention is explained in more detail using two embodiments, with reference to the drawings. The individual features of these embodiments can, as in the case of the above description of the embodiments, also be omitted or added in in any combination if the advantages associated with these features are not important in a specific application.

Figure 2:
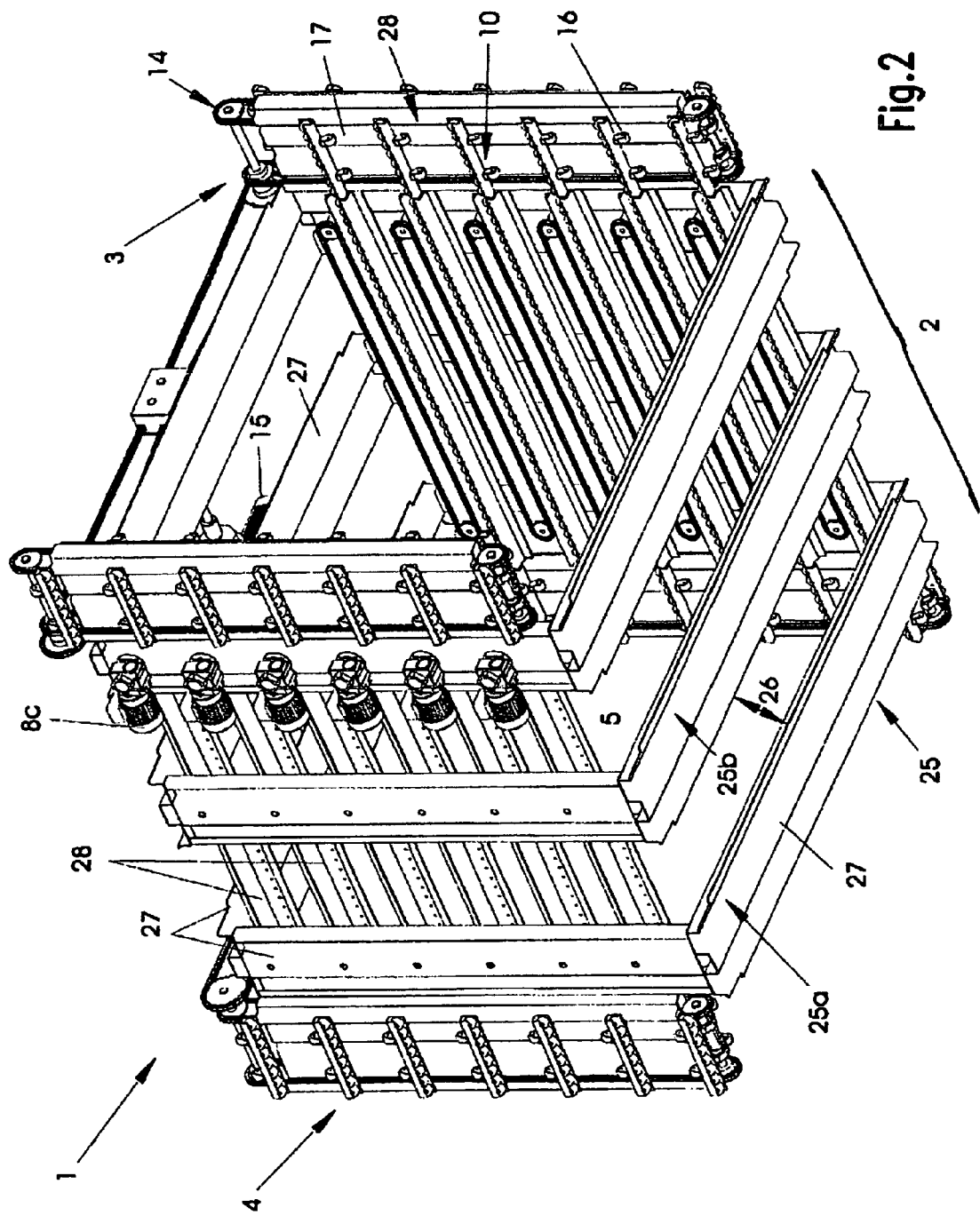
Figure 3:
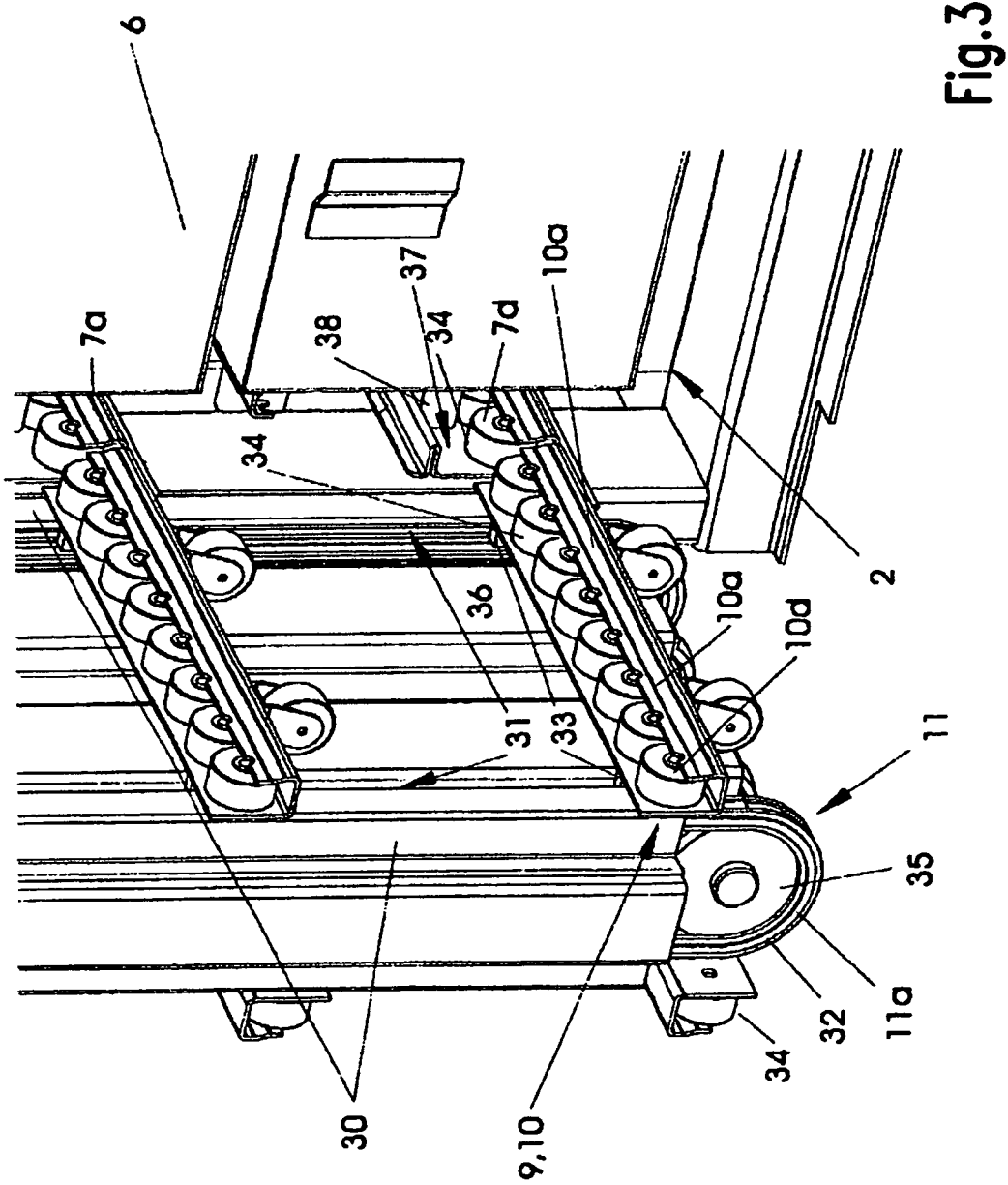
Figure 4:
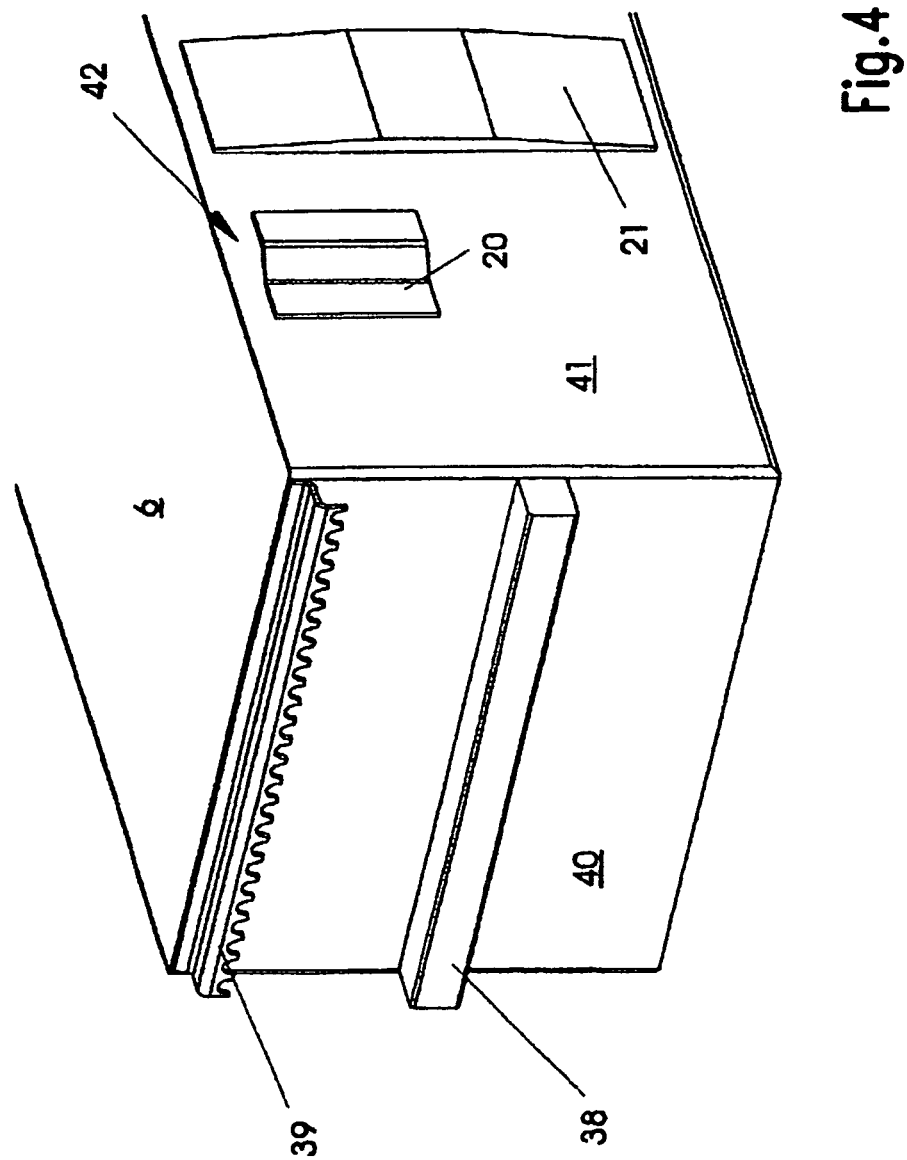
Figure 5:
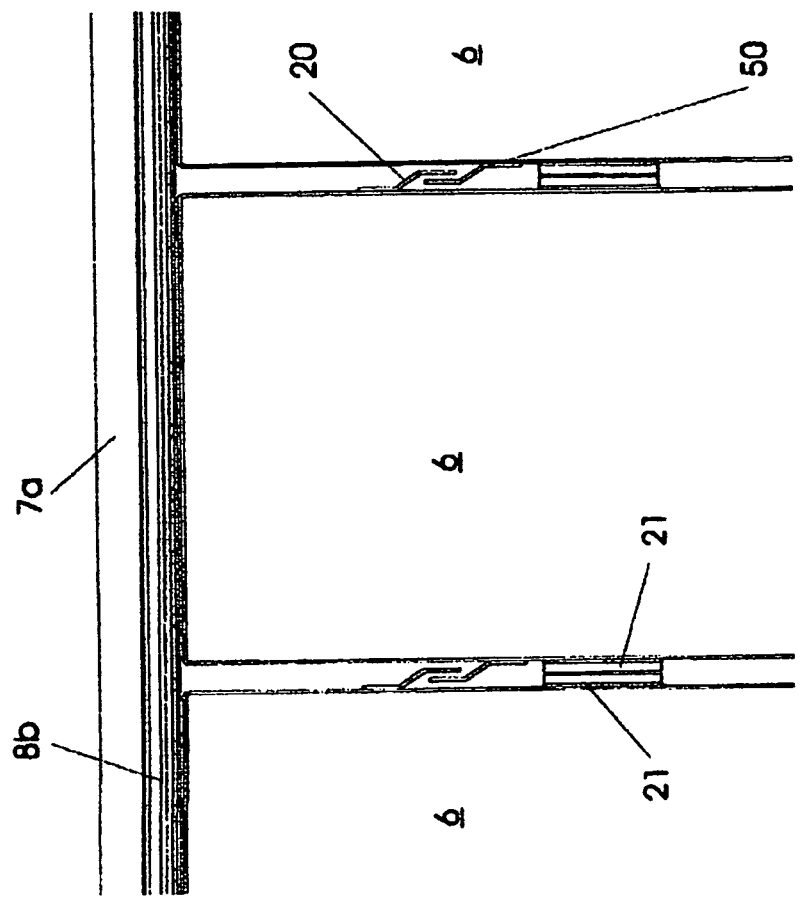
Figure 6:
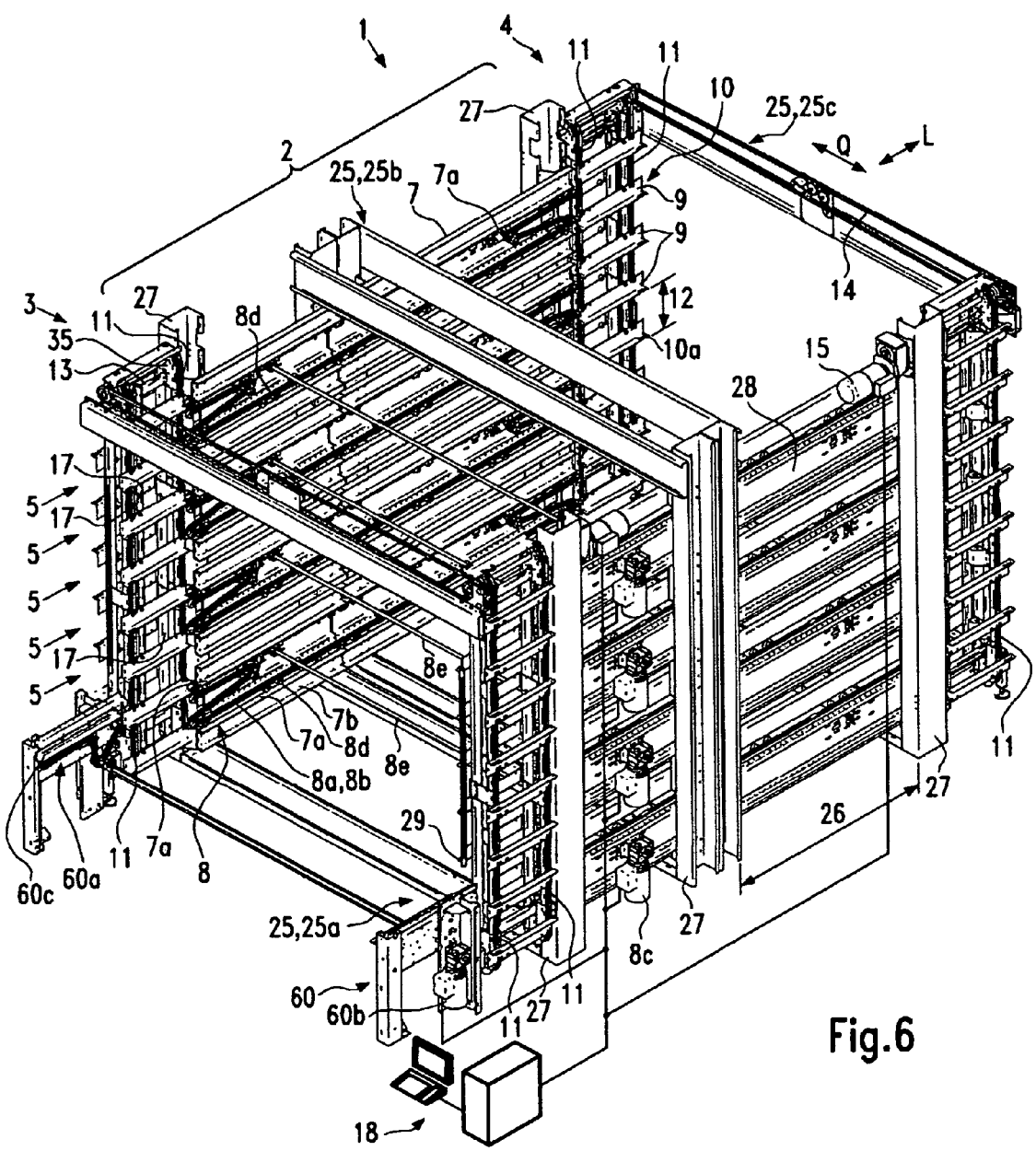
Figure 7:
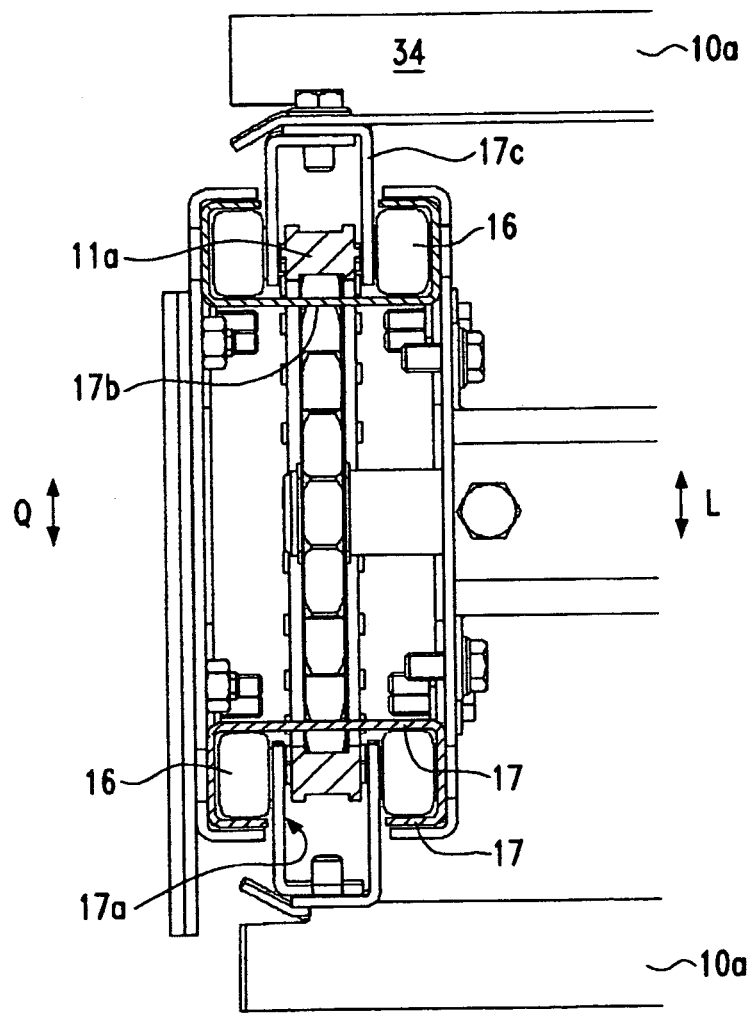
Figure 8:
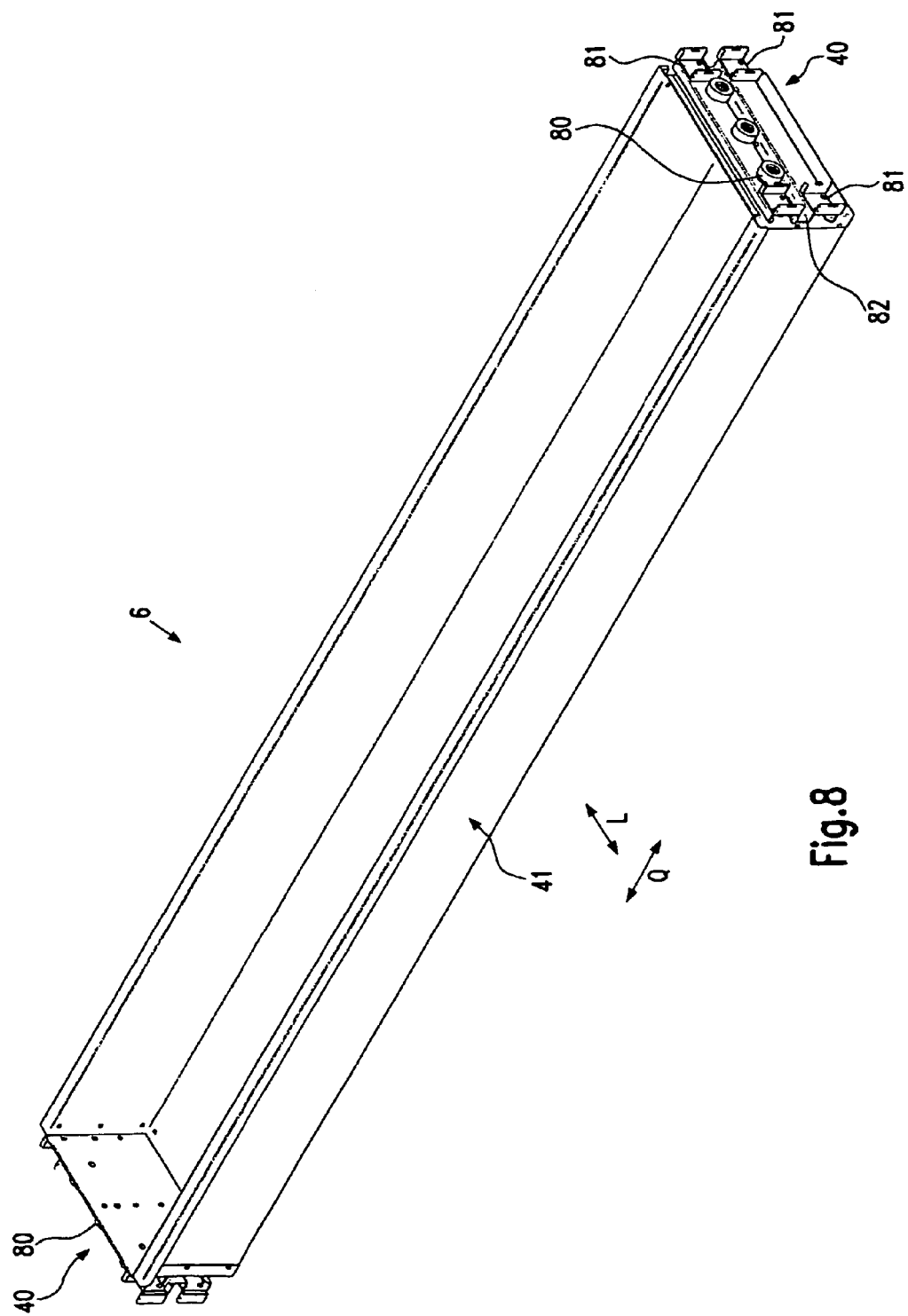
Figure 9:
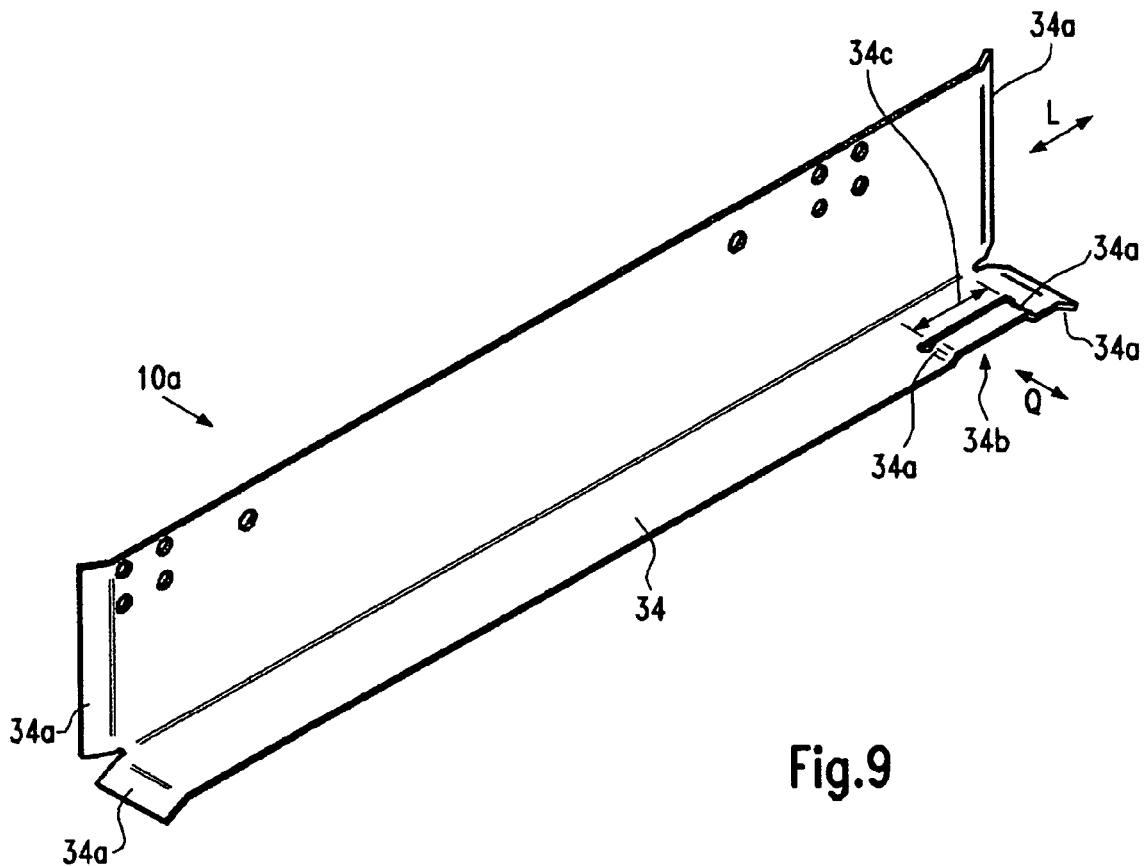
Figure 11:
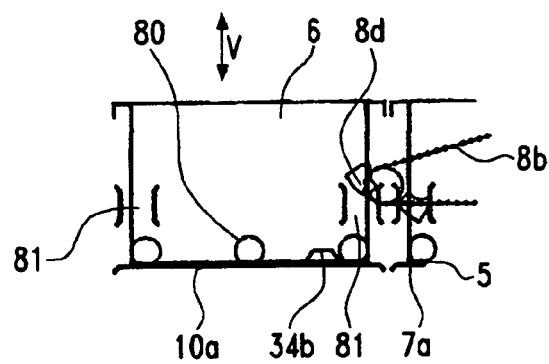
Figure 10:
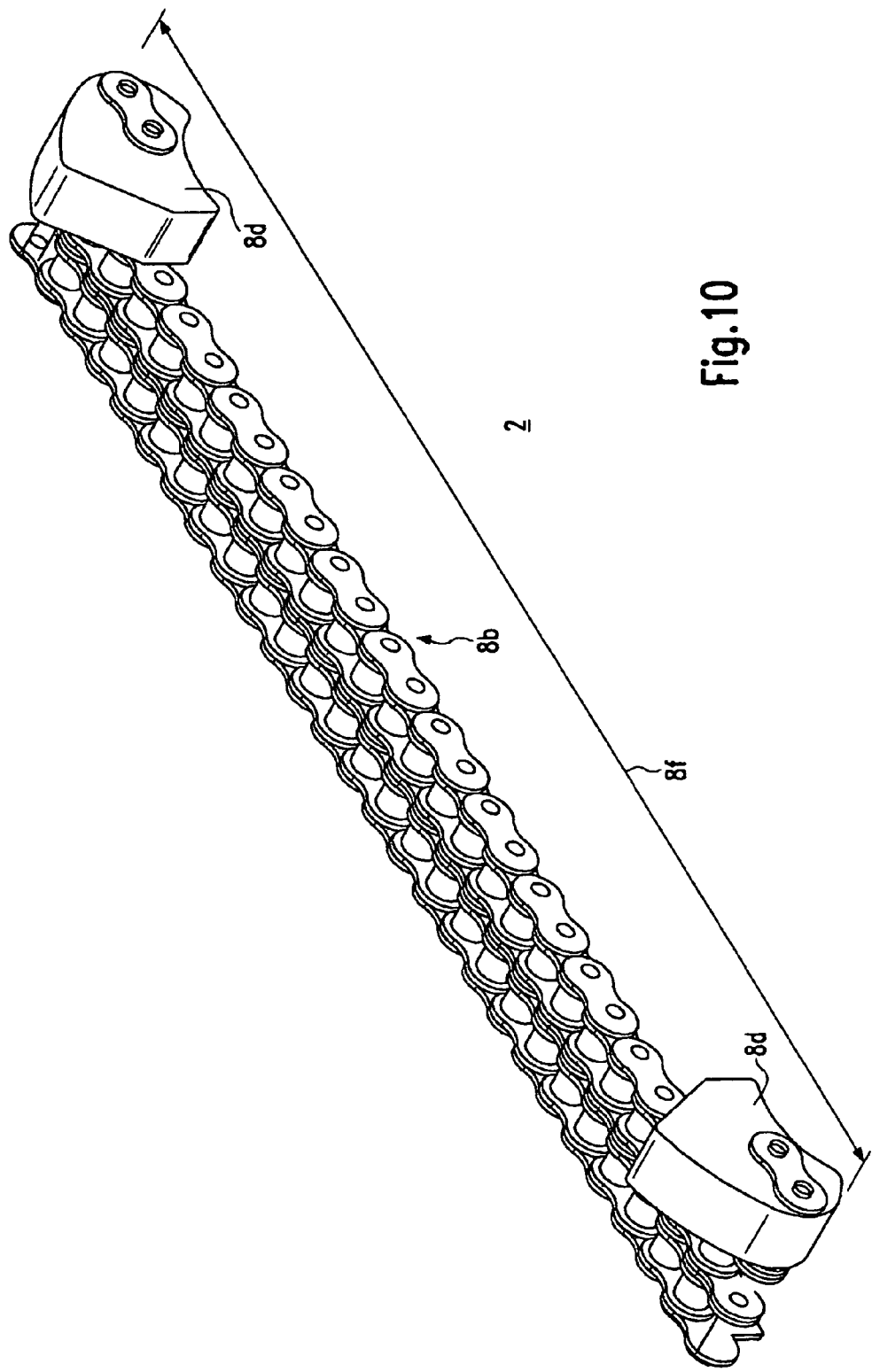

Shown are:

FIG. 1 a schematic perspective view of a horizontal circuit storage system according to the invention;

FIG. 2 a further schematic perspective representation of the horizontal circuit storage system of FIG. 1;

FIG. 3 a schematic perspective representation of a detail of the horizontal circuit storage system of FIG. 1;

FIG. 4 a schematic perspective representation of a load-carrier for the horizontal circuit system of FIG. 1;

FIG. 5 a schematic top view onto load-carriers in a storage plane;

FIG. 6 a schematic perspective view of a further embodiment of a horizontal circuit storage system according to the invention;

FIG. 7 a horizontal cut through a vertical conveyer of the horizontal circuit storage system of FIG. 6;

FIG. 8 a schematic perspective representation of a load-carrier for the horizontal circuit system of FIG. 6;

FIG. 9 a rail of a vertical conveyer of the embodiment of FIG. 6 in a schematic perspective view;

FIG. 10 a detail of a horizontal conveyer of the embodiment of FIG. 6 in a schematic perspective view;

FIG. 11 a detail of the horizontal circuit storage system of FIG. 6 in a side-view;

FIG. 12 to 17 schematic perspective representations of the operation of the storage system according to the invention during the delivery of load-carriers to a delivery station.

First the configuration of a storage system according to the invention is explained with reference to FIG. 1.

FIG. 1 shows a schematic perspective representation of a horizontal circuit storage system 1 according to the invention. The horizontal circuit storage system 1 has a storage zone 2. The storage zone 2 lies between two vertical conveyers 3, 4 each located in the longitudinal direction of the storage zone 2 at an end of the storage zone 2.

The storage zone 2 is vertically divided into a plurality of storage planes 5, each of which extends in a horizontal direction. At the same time, the number of storage planes 5 is preferably less than the maximum number of load-carriers that can be held in a storage plane, so that more storage goods can be held horizontally than vertically.

Storage goods, such as assembly parts, tools or goods, for example, are held in the horizontal circuit storage system 1 in movable load-carriers 6. The load-carriers 6 are arranged horizontally in a row, one behind the other, in the storage planes 5 of the storage zone 2 and preferably extend across the entire width of the storage zone in the transverse direction.

The load-carriers 6 are held in the individual storage planes 5 by a support means, for example in the form of a rail system 7, on which the load-carriers 6 are supported in such a manner that they can be shifted in the longitudinal direction. The rail system 7 has a plurality of stacked horizontal rails 7a, whereby each storage plane 5 is formed by a rail pair at the two sides lying in the transverse direction Q of the storage zone 2.

A horizontal conveyer 8 is associated with each storage plane 5, whereby the horizontal conveyer 8 makes it possible to move the load-carriers 6 of a storage plane in the longitudinal direction L of the storage zone, i.e. in a direction towards or away from the vertical conveyers 3, 4. The horizontal conveyers 8 can have a traction drive 8a that, for example, is arranged in the transverse direction on each side of a storage plane 5, in the area of the rails 7a, and that extends in the longitudinal direction of the storage zone 2 across a part of the storage plane, preferably more than half of a storage plane, up to close to the vertical conveyers 3, 4. In particular, the traction drive 8a can comprise roller chains 8b on both sides. As furthermore shown in FIG. 1, each horizontal conveyer 8 or each traction drive 8a can have its own drive 8c.

The configuration of each of the two vertical conveyers 3, 4 is essentially the same, so that in the following only the configuration of the front vertical conveyer 3 as seen in FIG. 1 is discussed by way of example. The following description applies accordingly to the configuration of the rear vertical conveyer 4 in FIG. 1.

The vertical conveyer 3 vertically interconnects the ends of the storage planes 5 lying in the longitudinal direction in such a way that the load-carriers 6 can be transported from one storage plane 5 to another storage plane 5 lying above or below the first one. The vertical conveyer 3 is constructed with a single shaft and so only allows movement of the load-carriers in one direction at a time. In the embodiment of FIG. 1 moreover, only a single load-carrier 6 can be held in a transport plane of the vertical conveyer at a time.

The vertical conveyer 3 can have a plurality of stacked transport planes 9, each of which can hold load-carriers 6. The transport planes 9 can be formed by a rail system 10 with rails 10a, which in particular can be formed identically to the rail system 7 of the storage zone 8 as shown in FIG. 1. The spacing between the transport planes 9 thereby corresponds to the spacing between the storage planes 5.

The vertical conveyer 3 can likewise have one or more traction drives 11 with one or more traction means 11a on which the support means, particularly the rail system 10, is mounted with the traction means in a circulating manner. In particular, as in the case of the rail system 7 of the storage zone 2, it is possible for a traction drive 11a to be mounted on each side of the storage system 1.

The vertical conveyer 3 extends across the entire height of the storage zone 2 and is, across the length of the traction means 11a, provided with a plurality of rails 10a spaced apart from one another at a distance 12, which corresponds to the preferably constant distance between the rails 7a of the individual storage planes 5. In this way, the rails 7a of the storage planes 5 of the storage zone 2 are always aligned with the rails 10 of the vertical conveyer 3 when the vertical conveyer 3 has moved on by the distance 12.

In particular, the vertical conveyer 3 in the embodiment shown in FIG. 1 comprises, on each of the two sides facing in the transverse direction Q, two vertically arranged traction drives 11 in the form of chains or belts, which are spaced apart from one another in the longitudinal direction L and between which the rails 10a extend horizontally. The tight span of the traction drive 11 faces the interior of the horizontal circuit storage system 1, and the slack span faces the exterior. These two traction drives are rigidly connected to each other via a shaft 13 so that they always turn at the same speed. At the two transverse sides, the traction drives 11 are connected to each other and to a drive 15 via a further gearing 14, for example, likewise a traction drive. A separate drive 15 is preferably associated with each vertical conveyer 3, 4.

If the two vertical conveyers 3, 4 are operated, the rails 10a circulate vertically with the traction means 11a. In order to simplify this movement if the rail system 10 of the vertical conveyer 3 is loaded by the weight of the load-carrier 6, rollers 16 that roll vertically are provided on the rail system, whereby these rollers are supported on a vertical running surface 17. Preferably at least one such roller 16 is arranged on each rail 10a below the supporting surface on which the load-carriers 6 lie, so that they are pressed against the running surface 17 by the weight of the load-carriers 6 and carry a portion of the weight load.

In order to shorten the paths to be covered by the vertical conveyers 3, 4 and thus also shorten the transport times, the number of load-carriers that can be arranged in a row one behind the other in a storage plane can be greater than the height of the vertical conveyers, expressed as the number of load-carriers that can be arranged one above the other in this height.

The load-carriers 6 of the horizontal circuit storage system 1 can, as shown in FIG. 1, be formed as containers that are open at the top, into which the storage goods are laid. It is, however, also possible to use flat formats or closed containers. On its front faces facing in the longitudinal direction, each load-carrier is preferably provided with at least one coupling 20 and at least one leading chamfered surface 21, the exact function of which will be explained in more detail below.

The control of the drives 8c, 15 of the horizontal conveyers and vertical conveyers is handled by a preferably programmable control unit 18, for example, a computer, which also handles the warehouse management. The control unit 18 controls the drives 8c, 15 independently of one another and selects such a combination of these drives that it is possible to access any given load-carrier in the storage zone 2.

If a central drive (or a plurality of central drives) is used instead of a plurality of drives 8c, 15, the control unit 18 can also handle the control of the couplings with which the drive movement of the drive is distributed to the individual storage planes and vertical conveyers.

In a schematic perspective view, FIG. 2 shows the horizontal circuit storage system of FIG. 1 without the load-carriers 6, in order to explain the configuration of the support structure in more detail. The same reference numbers as in FIG. 1 are used in the following.

The storage zone 2 is formed by a frame structure 25, which surrounds the storage zone 2 in the transverse direction. The frame structure 25 has a plurality of individual frames 25a, 25b arranged at a distance 26 from one another, whereby the number of individual frames and the distance 26 between them depend on the length of the storage zone 2 in the longitudinal direction and its height, as well as the loads to be expected. The individual frames 25a, 25b are built up from four profile supports 27, whereby one profile support is each arranged on the bottom and top of the storage zone and one profile support is arranged on each side of the storage zone, so that the storage zone 2 is spanned and enclosed by the profile supports 27. On the side profile supports 27, longitudinal supports 28 running horizontally in the longitudinal direction are mounted, whereby these longitudinal supports 28 bear the support means 7 of the individual storage planes 5. The drives 8c of the horizontal conveyers are preferably mounted on a side profile support 27 on its side facing away from the storage zone 2. The drives 15 for the vertical conveyers 3, 4 are mounted on an overhead support 27.

One frame is arranged on each of the two ends of the storage zone 2 in the longitudinal direction of the horizontal circuit storage system 1. The vertical conveyers 3, 4 are mounted on the side profile supports 27 of these frames. The traction drive 14 with the rail system 10 and the running surfaces 17 for the rollers 16 is preassembled into a module that can be handled as a single piece, such a module being arranged identically on each side, in pairs, on the end and mounted on the side profile supports 27. The running surfaces 17 are formed from vertical profile supports 28 that carry the weight of the load-carriers 6 on the vertical conveyers 3, 4 and that are preferably a part of the preassembled module.

FIG. 3 shows a detail of the lower area of a side of the vertical conveyer 3 in a schematic perspective representation. The same reference numbers are used as above.

As can be seen in FIG. 3, the traction means 11a is located in the area of the storage zone 2, below a cover 30 that faces the interior of the horizontal circuit storage system, said cover 30 leaving open a gap 31 at the flanks 32 of the traction mechanism 11a, preferably a chain said gap opening in the longitudinal direction. On the facing flanks of the traction mechanism 11a, an attachment means 33 is mounted which connects the rails 10a to the traction mechanisms 11a.

The rollers 10d of the transport planes or of the rail system 10 are arranged in such a way that they form a supporting surface 34 for the load-carriers 6 and can be aligned with the supporting surface 34 formed by the rollers of the rail system at the side of the storage zone. As the rails 10 circulate with the traction means 11a, the supporting surface 34 accordingly faces downwards on the opposite side of the rail lift, because the rails 10a together with the traction means 11a are turned around via rollers 35 at the two ends of the rail lift in a vertical direction.

As can further be seen in FIG. 3, the rails 7a of the storage zone 2 are provided with a cover 36 at the top, which runs at a distance above the supporting surface 34 parallel to the rollers 7d of the rail system 7. As a result, a retaining groove 37 is formed that extends in the longitudinal direction and in which retaining projections 38 are guided, whereby the load-carriers 6 are supported on the support means 7, 10 by the bottom surfaces of the retaining projections 38.

The configuration of the load-carriers is now explained with reference to FIG. 4. FIG. 4 shows a schematic perspective view of a load-carrier 6 as it can be used in the horizontal circuit storage system 1 in accordance with one of the above figures. FIG. 5 shows a top view of the load-carriers 6 of a storage plane. The reference numbers from FIG. 1 to 3 are used as far as the corresponding elements agree with respect to function and configuration.

On its side surfaces 40 facing in the transverse direction, the load-container 6 is provided with a retaining projection 38 that extends across the entire depth of the load-container in the longitudinal direction. As is explained above, the load-container 6 is supported on the support means 7, 10 by the retaining projection 38. The load-carrier 6 furthermore has a tooth profile 39 whose tooth shape and tooth separation are dimensioned in such a way that it engages in the traction mechanism 18, formed as a roller chain, of the horizontal conveyer 8.

On its one front face 41 pointing in the longitudinal direction (only one of the two front faces can be seen in FIG. 4) the load-carrier 6 is provided with the coupling 20 and chamfered leading surface 21 on each side.

The coupling 20 is formed as a projecting angled profile that projects from the front face 41 in the longitudinal direction and that forms a coupling shackle or fishplate with a gap 42 opening inwards in the vertical and transverse direction. On the back face (not shown in FIG. 4) of the load-carrier 6, a pair of corresponding counter-couplings 50 (FIG. 5) is arranged which is adapted to engage in the gap 42 by likewise forming a gaps a coupling shackle or fishplate having an angled profile, said gap opening transversally outward. As can be further seen in FIG. 5, a pair of leading surfaces is also provided on the back face at the same location as on the front face 41.

FIG. 5 shows the coupling 20 and the counter-coupling 50 in the engaged state, so that the load-carriers 6 of a storage plane 5 are connected to one another while transferring a horizontal force, in particular a tensile force.

The leading surfaces 21 of two adjacent load-carriers 6 lie opposite one another and serve as a buffer and spacer between the load-carriers. In particular, they can be manufactured from a plastic such as hard rubber.

As can be seen in FIG. 4, the leading surfaces 21 flatten out vertically towards each edge and have the greatest thickness in their middle area, so that the load-carriers can move past one another vertically without catching.

The coupling 20 and the counter-coupling 50 are detachable from one another in a simple manner when the two load-carriers move away from one another vertically relative to one another, for example, via the vertical conveyers 3, 4. One load-carrier can furthermore be transported past another vertically without the coupling 20, 50 obstructing this movement, because the angle profiles easily move past one another into and out of the horizontal overlapping.

A further embodiment of the horizontal circuit storage system 1 is shown in FIG. 6 to 10. In the following description, the reference numbers of the embodiment of FIG. 1 to FIG. 5 are used as far as the elements indicated with these numbers agree in the function and/or configuration.

FIG. 6 shows a schematic perspective representation of a horizontal circuit storage system 1 according to the invention, whereby all panels are removed in order to allow a view into the interior. The horizontal circuit storage system 1 has a storage zone 2. The storage zone 2 lies between two vertical conveyers 3, 4, each located in the longitudinal direction L of the storage zone 2 at a respective end.

The storage zone 2 is divided vertically into a plurality of storage planes 5, each of which extends in a horizontal direction. At the same time, the number of storage planes 5 is preferably less than the maximum number of load-carriers that can be held in a storage plane, so that more storage goods can be held in a horizontal direction than in a vertical direction.

Storage goods, such as assembly parts, tools or goods, for example, are held in movable load-carriers 6 in the horizontal circuit storage system 1. A load-carrier 6 is shown in a schematic perspective representation in FIG. 8. The load-carriers 6 are arranged one behind the other horizontally in the storage planes 5 of the storage zone 2 and preferably extend across the entire width of the storage zone in the transverse direction Q.

The load-carriers 6 are held in the individual storage planes 5 by a support means, for example in the form of a rail system 7, on which the load-carriers 6 are supported in such a manner that they can be shifted in the longitudinal direction. The rail system 7 has a plurality of stacked horizontal rails 7a, whereby each storage plane 5 is formed by a rail pair on each of the sides lying in the transverse direction Q of the storage zone 2. In the case of the embodiment shown in FIG. 5, each of the rails 7a is formed by a side piece of a C-profile 7b, namely in consecutive storage planes, alternatingly from an upper and a lower side-piece of two C-profiles 7b lying one above the other.

A horizontal conveyer 8 is associated with at least one pair of storage planes 5, whereby the horizontal conveyer 8 makes it possible to move the load-carriers 6 of a storage plane in the longitudinal direction L of the storage zone, i.e. in a direction towards or away from the vertical conveyers 3, 4. The horizontal conveyers 8 can have traction drives 8a that, for example, are arranged in the transverse direction on each side of a storage plane 5, in the area of the rails 7a, and that extend in the longitudinal direction of the storage zone 2 across a part of the storage plane, up to the vertical conveyers 3, 4. In particular, the traction drive 8a can comprise a traction mechanism, such as chains 8b, on both sides of the storage zone. As is furthermore shown in FIG. 1, each horizontal conveyer 8 or each traction drive 8a can additionally have its own drive 8c. Drivers 8c are arranged on the traction mechanisms 8b.

Each horizontal conveyer 8 extends across, for example, two storage planes 5 that are adjacent vertically. As shown in FIG. 1, this can be accomplished by means of having a first and a second span of the chain drive 8a run along the two rails 7a of these storage planes. In this way, there is a mechanical forced coupling of the drive of the two storage planes driven by the horizontal conveyer 8, whereby the conveying direction in the one storage plane runs opposite to the conveying direction of the other storage plane. The horizontal conveyer 8 of a pair of storage planes is, as can be seen in FIG. 5, arranged in a vertical direction between the C-profiles 7b of this pair, so that in a vertical direction, a horizontal conveyer and two rails alternate.

The two chain drives 8 on the two sides of the storage zone 20 are configured symmetrically and driven by the drive 8c.

The chain drives 8 on both sides are synchronised by a coupling bar 8e. The coupling bar 8e extends between the storage planes in the transverse direction Q across the entire width of the storage zone. All horizontal conveyers 8 of the horizontal circuit system 1 have the same construction.

The configuration of the two vertical conveyers 3, 4 is likewise essentially the same, so that in the following, only the configuration of the front vertical conveyer 3 as seen in FIG. 6 is discussed by way of example. The following description applies accordingly to the configuration of the rear vertical conveyer 4 of FIG. 6.

The vertical conveyer 3 vertically interconnects the longitudinal ends of the storage plane 5 in such a way that the load-carriers 6 can be transported from one storage plane 5 into another storage plane 5 lying above or below the first one. The vertical conveyer 3 is constructed having a single shaft and allows movement of the load-carriers in only one direction at a time. In the embodiment shown in FIG. 6, the depth of the vertical conveyer is dimensioned so that only a single load-carrier 6 can be held in a transport plane of the vertical conveyer.

The vertical conveyer 3 can have a plurality of stacked transport planes 9, each of which can hold load-carriers 6. The transport planes 9 can be formed from a rail system 10 comprising rails 10a, for example from an angled profile. The distance between the transport planes 9 in the vertical conveyer 3 corresponds to the distance between the storage planes 5.

The vertical conveyer 3 can likewise have one or more traction drives 11 with one or more traction means 11a on which the support means, particularly the rail system 10, is mounted with the traction means in a circulating manner. In particular, as in the rail system 7 of the storage zone 2, at least one traction drive 11a may be mounted on each side of the storage system 1.

The vertical conveyer 3 extends across the entire height of the storage zone 2 and is, across the length of the traction means 11, provided with a plurality of rails 10a spaced apart from one another at a distance 12, which corresponds to the preferably constant distance between the rails 7a of the individual storage planes 5. In this way, each of the rails 7a of the storage planes 5 of the storage zone 2 is aligned with the rails 10a of the vertical conveyer 3 when the vertical conveyer 3 has moved on by the distance 12.

In particular, the vertical conveyer 3 in the embodiment shown in FIG. 6 comprises, on each of the two sides facing in the transverse direction Q, two vertically arranged traction drives 11 in the form of chains or belts, which are spaced apart in the longitudinal direction L and between which the rails 10a extend horizontally. The tight span of the traction drive 11 faces the interior of the horizontal circuit storage system 1, and the slack span faces the exterior. The traction drives 11 on one side of the horizontal circuit storage system are rigidly connected to each other via a shaft 13, so that they always turn at the same speed. At the two transverse sides, the traction drives 11 are connected to each other and to a drive 15 via a further gearing 14, for example, likewise a traction drive. In the transverse direction Q, the gearing 14 extends across the entire width of the horizontal circuit storage system 1. A separate drive 15 is preferably associated with each vertical conveyer 3, 4.

If the vertical conveyers 3, 4 are operated, the rails 10a circulate vertically with the traction mechanism 11a. In order to simplify this movement if the rail system 10 of the vertical conveyer 3 is loaded by the weight of a load-carrier 6, rollers 16 that roll vertically are provided, whereby these rollers are supported on a vertical running surface 17.

In order to shorten the paths to be covered by the vertical conveyers 3, 4 and therefore also the transport times, the number of load-carriers that can be arranged one behind the other in a storage plane can be greater than the number of storage goods planes 5.

The control of the drives 8c, 15 of the horizontal conveyers and vertical conveyers is handled by a preferably programmable control unit 18, for example, a computer, which also handles the warehouse management. The control unit 18 controls the drives 8c, 15 independently of one another and selects such a combination of these drives that it is possible to access any given load-carrier in the storage zone 2. If a central drive (or a plurality of central drives) with couplings is used instead of a plurality of drives 8c, 15, the control unit 18 can also handle the control of the couplings with which the drive movement of the drive is distributed to the individual storage planes and vertical conveyers. All drives 8c, 15 are arranged on one side of the horizontal circuit storage system 1.

The storage zone 2 is formed by a frame structure 25, which surrounds the storage zone 2 in the transverse direction. The frame structure 25 has a plurality of individual frames 25a, 25b arranged at a distance 26 from one another, whereby the number of individual frames and the distance 26 between them depend on the length of the storage zone 2 in the longitudinal direction as its height, as well as the loads to be expected. The individual frames 25a, 25b are built up from four profile supports 27, whereby one profile support is arranged on the bottom and top of the storage zone and one profile support is arranged on each side of the storage zone, so that the storage zone 2 is spanned and enclosed by the profile supports 27. Longitudinal supports 28 running horizontally in the longitudinal direction are mounted on the side profile supports 27, whereby these longitudinal supports 28 bear the support means 7 of the individual storage planes 5. The drives 8c of the horizontal conveyers are preferably mounted on a lateral profile support 27 on its side facing away from the storage zone 2.

One frame each is arranged on the two ends of the storage zone 2, said ends lying in the longitudinal direction of the horizontal circuit storage system 1. The vertical conveyers 3, 4 are mounted on the side profile supports 27 of these frames. The traction drive 14 with the rail system 10 is preassembled into a module that can be handled as a single piece, such a module being arranged identically on each side, in pairs, on the end and mounted on the side profile supports 27. The channels 17 are formed from vertical profile supports 29 that hold the weight of the load-carriers 6 on the vertical conveyers 3, 4 and that are preferably a part of the preassembled module.

The horizontal circuit storage system 1 furthermore has a delivery station 60, which is arranged, with regard to the one vertical conveyer 3, in the longitudinal direction L on the side turned away from the storage zone 2. The storage goods in the load-carriers 6 are placed into and removed from storage at the delivery station 60. The delivery station 60 is given a separate conveyer 60a, which is preferably constructed analogously to the horizontal conveyers 8b, so that reference is made to their description above.

In the delivery station 60, the load-carriers 6 lie on a pair of rails 60c that lie opposite each other in the transverse direction Q and that are preferably aligned with a storage plane 5 of the storage zone 2, so that a load-carrier can be transferred from this storage plane 5 into the delivery station 60 without movement of the vertical conveyer 3. As can be seen in FIG. 1, the conveyer 60a of the delivery station 60 has its own drive 60b, which is mounted on the same side as the drives 8c, 15 and which is likewise controlled by the control unit 18.

In order to engage the load-carriers 6 on the vertical conveyers 3, 4, both from the conveyer 60a of the delivery station 60 and from the horizontal conveyers 8, the drivers 8d of the conveyers 60a and 8 always protrude, in the idle position, into the area of the vertical conveyers, where they engage with corresponding driver couplings of the load-carriers.

FIG. 7 shows a horizontal cut through one side of a vertical conveyer 3, 4 in a schematic perspective representation. The same reference numbers are used as in FIG. 6.

As can be seen in FIG. 7, preferably a roller pair 16 is associated to each rail 10a, whereby said roller pair runs vertically in a roller shaft 17a with little play, so that it touches only one of the two vertical running surfaces 17 and can roll on this surface. The roller shaft 17a is formed by a hollow profile 17b, which essentially extends across the entire height of the vertical conveyer 3, 4, both at the tight span and at the slack span of the traction mechanism 11. The rollers 16 are mounted directly on the traction means 11, if chains are used as the traction means 11, preferably at those chain links to which the rails 10a are also attached via dryer arms or brackets 17c. In this way, the transverse loads acting in the transverse direction Q that arise when the rails 10a are loaded are supported by the rollers 16 and the vertical running surfaces 17. The driver arms 17c are preferably attached to at least two chain links spaced at some distance from each other, in order to take up load moments. As the rails 10a circulate with the traction mechanism 11a, a supporting surface 34 of the rails 10a, on which the load-carriers 6 are supported, correspondingly faces downwards on the opposite side of the rail lift, because the rails are turned around via rollers 35 (cf. FIGS. 1 and 6) at the two ends of the vertical conveyers 3, 4 that are situated in a vertical direction.

The configuration of the load-carriers is now explained with reference to FIG. 8. FIG. 8 shows a schematic perspective view of a load-carrier 6 as it can be used in the horizontal circuit storage system 1 in accordance with one of the above figures. The reference numbers from FIGS. 6 and 7 are used as far as the elements agree with respect to function and configuration.

On its side surfaces 40 facing in the transverse direction, the load-container 6 is provided rollers 80 arranged one behind the other in the longitudinal direction L, as well as driver couplings 81, each of which can be mounted on a profile support 82 extending in the longitudinal direction L. As shown in FIG. 8, a total of four driver couplings 81 are provided on each side surface 40 of a load-container 6, with each driver coupling 81 being in the form of a U-profile that opens upwards and downwards away from the side surfaces 40. One pair is arranged on the two ends of the side surfaces that lie in the longitudinal direction L so that they are flush with one another and one is arranged above the other. Two driver couplings 81 are each located above the supporting plane of the load-carriers 6 defined by the under-side of the rollers 80 on the rail system 7, and two are each below that plane.

FIG. 9 shows a rail 10a of a vertical conveyer in a schematic perspective view. If elements are used that have already been described above, their reference numbers are likewise used in FIG. 9.

The rail 10a is made of a sheet metal material that is essentially bent at a right-angle and that is given leading chamfers 34a on its ends facing in the longitudinal direction L. The supporting surface 34 on which the load-carriers 6 are transported in the vertical conveyer 3, 4 during operation, is given a locking means, in the present embodiment a locking projection 34b that protrudes upwards from the vertical conveyer 34.

As is shown in FIG. 9, the locking projection 34b can be stamped from the sheet metal material of the rails 10a and likewise be given leading chamfers 34a on its two ends lying in the longitudinal direction.

The length 34c of the projection 34a is preferably less than or roughly equal to the distance between the rollers 80 of a load-carrier. The projection 34b serves as overrun protection and as a brake for the transfer of load-carriers 6 from the storage zone 2 onto the vertical conveyer 3, 4, because the rollers 80 must be moved over the projection 34b.

FIG. 10 shows a perspective representation of a traction mechanism 8b in the form of a chain of the horizontal conveyers. The drivers 8d (cf. FIG. 6) are arranged on the flank of the traction mechanism 8b facing the storage zone 2. Each pair of drivers 8d is arranged at a distance 8e from the other, whereby the distance 8e is dimensioned so that each pair of drivers 8b can be driven into the two holders 81 (cf. FIG. 8) of a load-carrier 6. Two consecutive pairs of drivers 8d are arranged so that the load-carriers do not touch one another. The distance between the driver pairs determines the distance between the load-carriers 6 when they are transported on the storage planes 5. The lower driver couplings 81 engage in the drivers 8d at a storage goods plane 5 above the horizontal conveyer 8 associated with it, and the upper river couplings 81 of a load-carrier engage in the carriers 8d at a storage goods plane below the horizontal conveyer associated with it.

As shown in FIG. 10, the circumference of the drivers 8d is formed irregularly, whereby the two drivers 8d of a pair are arranged in a mirror-inverted way.

The contour on the outer circumference of the driver 8d results from the function of the driver 8d, which is to dip in and out of the driver couplings 81 during the circuit of the traction mechanism 8b in the horizontal conveyer. The shape of the drivers 8d furthermore allows the driver coupling 81 of a load-container 6 that is transported on the vertical conveyer 3, 4 past a storage plane 5 to pass the driver. This situation is shown schematically in a side-view in FIG. 11: The load-carrier 6 is held at rest on a rail 10a of a vertical conveyer 3, 4 by the projection 34b and is transported in vertical direction V past a storage plane 5. In the idle position, the driver 8d protrudes into the shaft of the vertical conveyer 3, so that it dips into the driver couplings 81 of the load-carriers 6 in the vertical conveyers at both ends of the storage zone 2 and can pull these into the storage plane 5 as needed.

If the load-carrier 6 is transported past the storage plane 5, the driver 8d passes the driver coupling 81 from top to bottom, meaning it consequently drives through the driver couplings 81.

In the following, the function of the horizontal circuit storage system 1, as shown in FIG. 1 to 11, is explained using FIG. 12 to 17. FIG. 12 to 17 show, in a schematic perspective view, only the load-carriers 6 in the horizontal circuit storage system 1, without the remaining components of the horizontal circuit storage system 1 shown in FIG. 1 to 11, in order to better represent the movement sequence as storage goods are placed into and removed from storage.

The storage zone 2 can be seen in the load-containers arranged one above the other in storage planes and one behind the other in storage planes. The two vertical conveyers 3, 4 are located at the two ends of the storage zone. The delivery station 60, at which the load-carriers 6 are delivered for access from outside the horizontal circuit storage system 1 is located on the other side of the front vertical conveyer 3. The plane of the delivery station 60 preferably aligns with a storage plane. Storage goods can either be manually or automatically placed into or removed from storage at this position. The vertical conveyer 3 is located between the storage zone 2 and the delivery station 60. In the case of the embodiment shown in FIG. 12 to 17, the storage zone 2 continues with at least one, preferably two or more storage planes 5 below the plane of the delivery station.

As can be seen in FIG. 12, each storage point of the storage zone 2 is loaded with a load-carrier. An additional load-carrier is furthermore located in each vertical conveyer 3, 4 and an additional load carrier 6a is located in the delivery station 60, so that the horizontal circuit storage system 1 has more load-carriers 6 than can be held in the storage zone. In order not to temporarily store a load-carrier 6 in the delivery station, the horizontal circuit supply system 1 preferably has a number of load-carriers 6 that is greater than the number of storage points in the storage zone 2 by the number of vertical conveyers 3, 4 provided.

At the beginning of the loading and unloading process described by way of example, a previously delivered load-carrier 6a is located in the delivery station 60. Via the control unit 18, which activates the drives 9, 15 of the horizontal circuit storage system 1, an operator 62 specifies that the load-carrier 6b is destined to be the next to be accessed in the delivery station 60. The control unit 18 thereupon brings the horizontal circuit storage system 1 into a condition in which there is a horizontal circuit of the load-carriers 6 through at least two storage planes 5a, 5b.

For this purpose, the vertical conveyers 3, 4 are driven in opposite directions to one another, so that the transport planes of the front vertical conveyer 3 move, for example, downwards and the rails of the rear vertical conveyer 4 move upwards. As soon as a transport plane of the front vertical conveyer 3 is aligned with a rail 7 of the storage plane 5a in which the load-carrier 6b that is to be provided is located, the horizontal conveyer 8 of this storage plane is put into operation and the load-carriers 6 of this storage plane are moved towards the vertical conveyer 3, while, at the same time, the load-carrier 6d is pulled by the rear vertical conveyer 4 from the transport plane into the storage plane of the storage zone 2.

In the embodiment described above, the horizontal force for moving the load-carriers of a storage plane can be applied at any given point in the storage plane in the storage zone 2, because this force is transmitted to all load-carriers 6 via the leading surfaces 21 and the couplings 20, 50.

The horizontal conveyer 8 of this storage plane moves the load-carriers 6 towards the rear vertical conveyer 4 until the rear-most load-carrier 6e lies completely on the vertical conveyer 4 and is moved upwards by this vertical conveyer. In the course of this movement, the frontmost load-carrier 6f was transferred from the front vertical conveyer 3 into the storage zone 2. As soon as the frontmost load-carrier 6d lies completely on the front vertical conveyer 3 and thus the rearmost load-carrier is located completely inside the storage zone 2, this vertical conveyer moves down by one storage plane. At the same time, there is movement in the opposite direction in a storage plane 5b adjacent to storage plane 5a, for example, the storage plane lying underneath.

Figure 13:
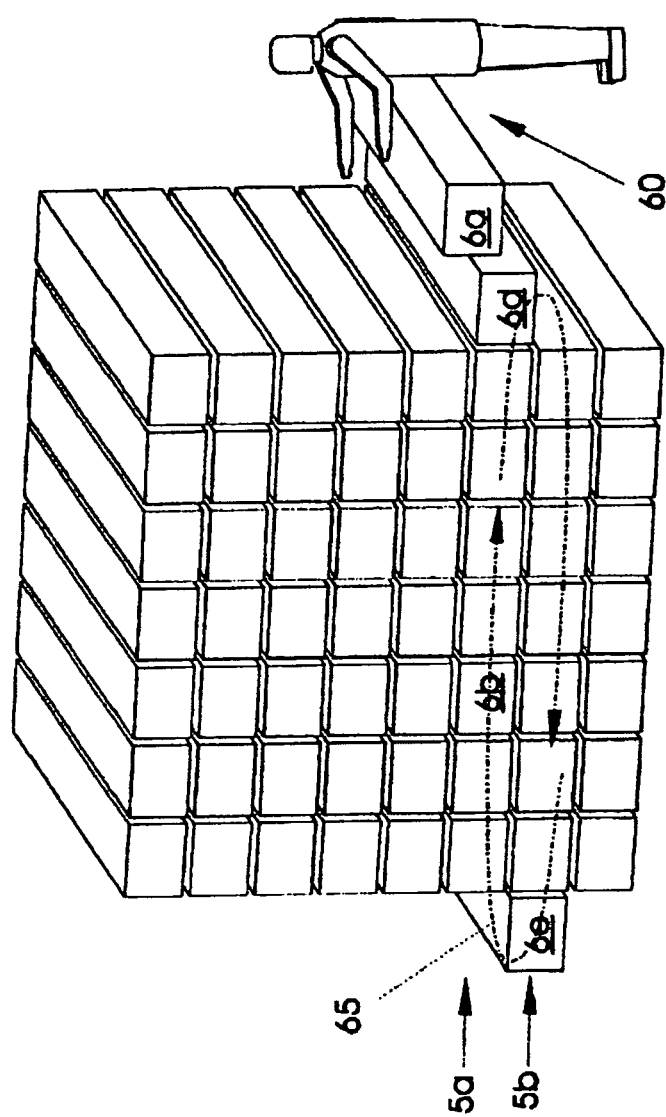
Figure 14:
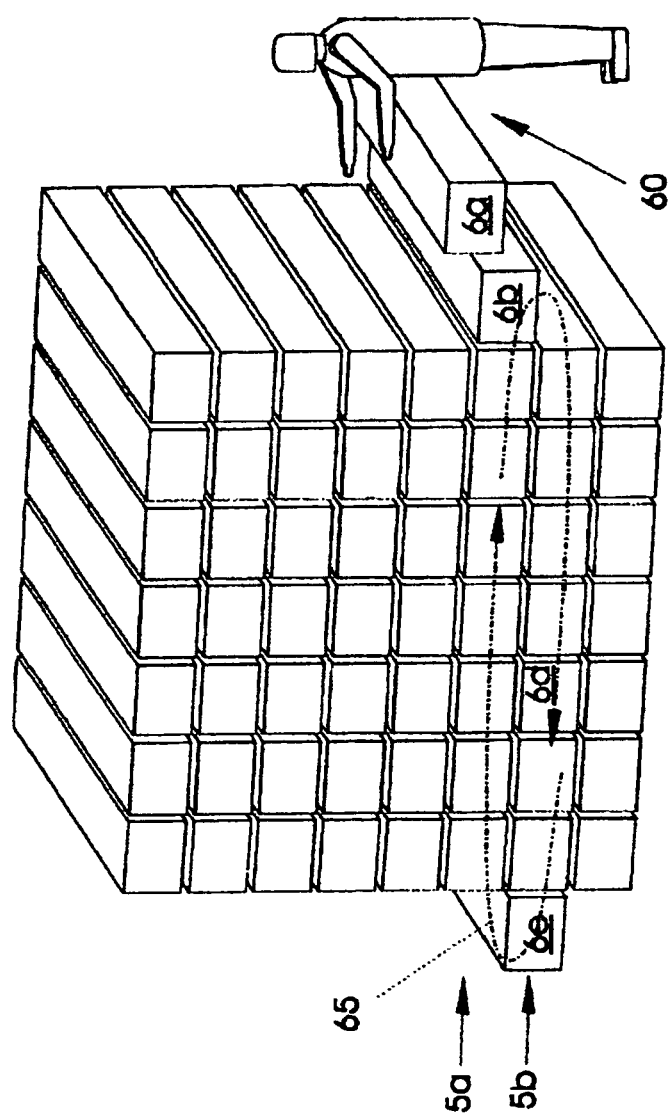

FIG. 13 shows the condition in which the frontmost load-carrier 6d of the storage plane 5a lies completely on the front vertical conveyer 3 and the rearmost load-carrier 6e of the storage plane 5b lies completely on the rear vertical conveyer 4.

In the next step, the front vertical conveyer 3 moves downwards and at the same time the rear vertical conveyer 4 moves upwards. As soon as the load-carriers 6d, 6e move away from their respective storage planes 5a, 5b on the vertical conveyers, they automatically decouple from the load-carriers remaining in the storage planes. In the course of the transport of the front load-carrier 6d into the lower plane 5b and of the rear load-carrier 6e into the upper plane 5a, these automatically couple into the load-carriers 6 already existing in the respective storage planes. The planes are subsequently moved horizontally again, as is described above in FIG. 12. In the course of this movement into the storage zone 2, the load-carriers 6d and 6e engage with the respective horizontal conveyers. This produces a horizontal circuit 65 of the load-carriers 6 through the storage planes 5a, 5b in a manner similar to a paternoster, until the load-carrier 6b that is to be provided is taken over by the vertical conveyer 3 that is adjacent to the delivery station 60. This situation is depicted in FIG. 13.

Figure 15:
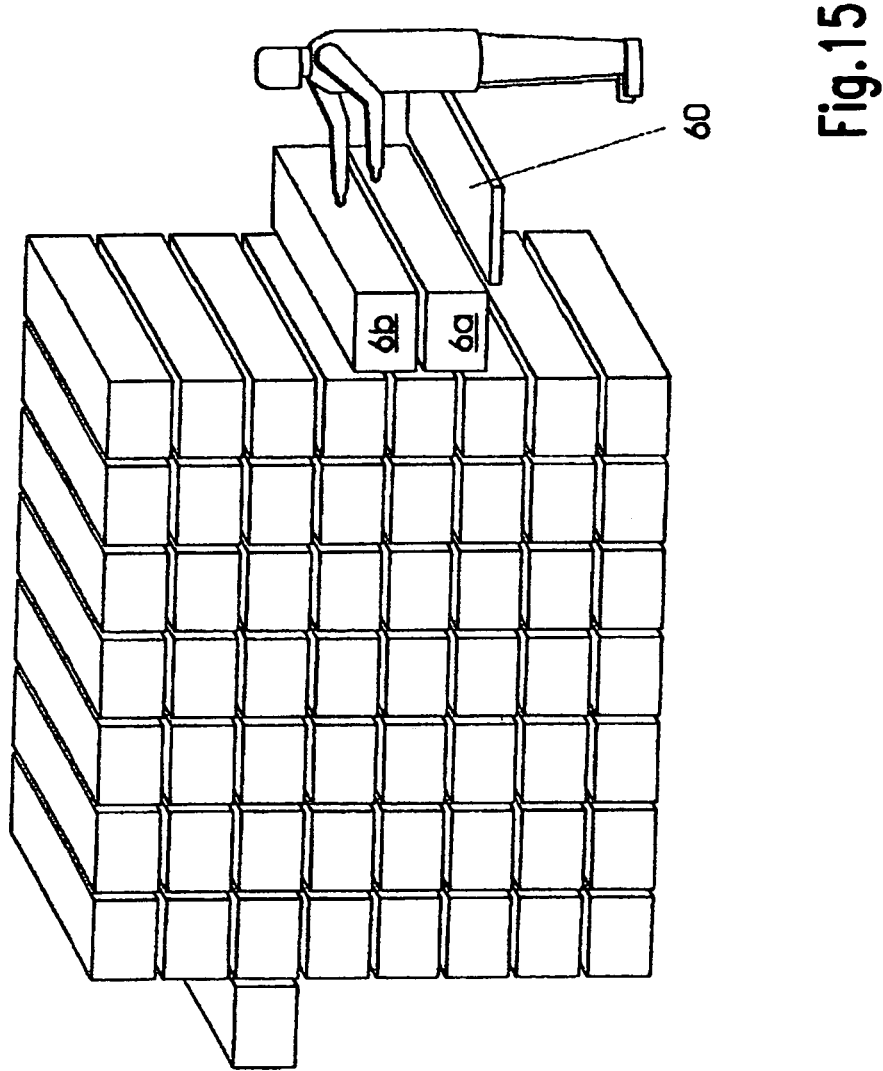
Figure 16:
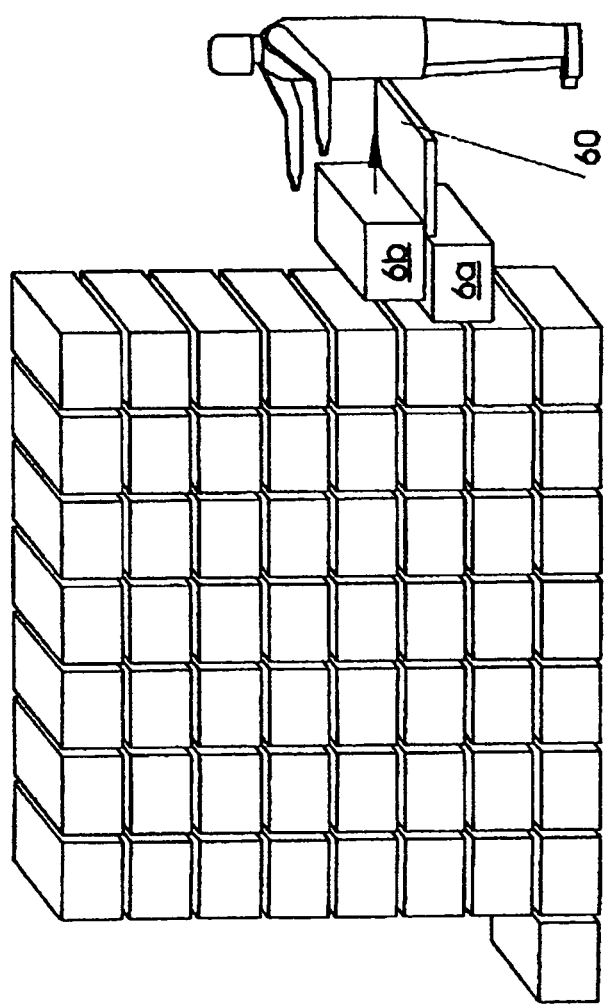

In order to convey the load-carrier 6b that is destined to be delivered at the delivery station 60, first the load-carrier 6a currently located at the delivery station 60 is transferred onto the one transport plane of the vertical conveyer 3. For example, the load-carrier 6a, as shown in FIG. 15, can be conveyed below the transport plane of the load-carrier 6b that is destined to be delivered next. Then, the vertical conveyer 3 moves again until the load-carrier 6b that is destined to be delivered comes to lie at the level of the delivery station 60 and can be transported horizontally to the delivery station 60. The previously delivered load-carrier 6a is then transported above the plane of the delivery station 60 and is available for the next horizontal circuit.

The transport of a load-carrier 6 from the vertical conveyer 3 to the delivery station 60 is brought about via the horizontal conveyer of the storage plane that is aligned with the delivery station. Because the load-carriers are coupled to one another, a load-carrier can be moved off beyond the vertical conveyer and to the delivery station 60 or it can be pulled away from the delivery station if the transport planes are brought into alignment with the storage planes.

Figure 17:
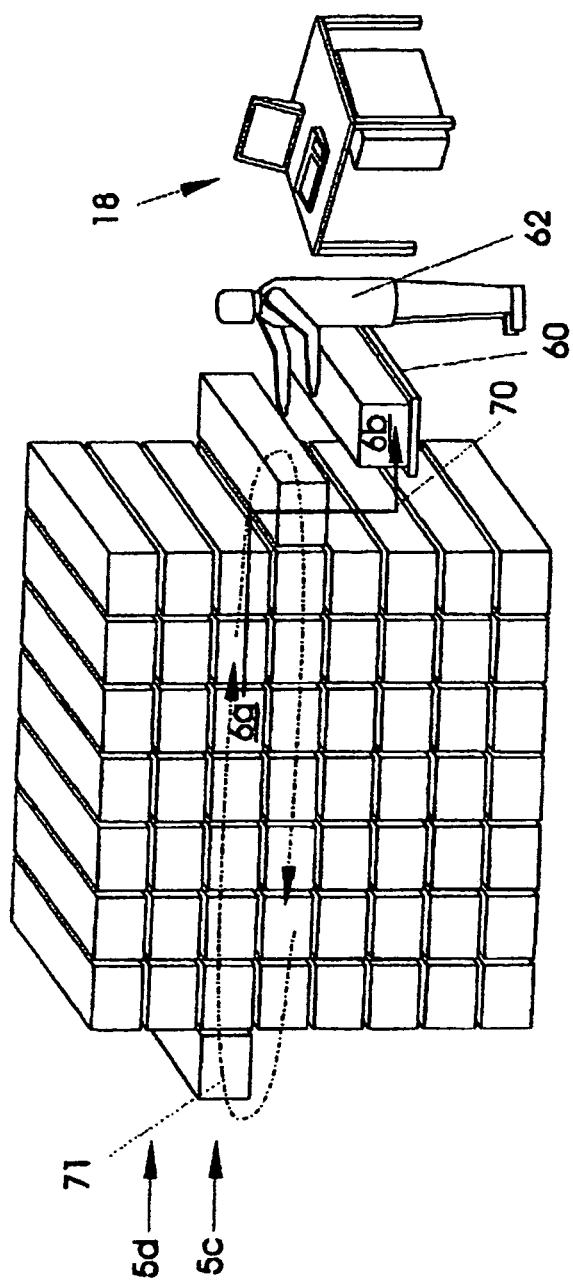

The sequence depicted using FIG. 12 to 17 repeats if, starting with the situation of FIG. 17, in which the load-carrier 6a that is destined to be delivered lies ready at the delivery station 60, the operator 62 specifies a next load-carrier 6e that is destined to be delivered. The arrow 70 schematically shows the path of this load-carrier 6e to the delivery station 60. For this purpose, the horizontal circuit 65 is established in the storage planes 5c and 5d in the direction indicated by the arrows 71 of the horizontal conveyers 8, driven in opposite directions of these two storage planes and in the two vertical conveyers 3, 4.

Because the vertical conveyers 3, 4 are given a multitude of transport planes, it is not necessary that these be operated in reverse during a horizontal circuit 65, because an empty rail 10 of a storage plane 5 is always available as soon as a load-carrier has been further transported from this plane by one plane or an integer multiple of a plane.

The horizontal circuit 65 does not have to go through two directly adjacent storage planes 5, but can instead also bridge over a number of storage planes lying between. Should, however, the planes involved in the horizontal circuit 65 lie farther apart, the horizontal circuit 65 will take longer, because a greater distance in a vertical direction will have to be bridged over by the vertical conveyers 3, 4.

The invention claimed is:

1. A horizontal circuit storage system (1) for storing storage goods carried by load-carriers (6),
   said system having a storage zone (2) with at least three stacked horizontal storage planes (5), and a plurality of load-carriers (6) each arranged in a row on said stacked horizontal storage planes,
   the storage zone (2) being defined between two vertical conveyors (3, 4) movable between the storage planes (5) in a vertical direction,
   a horizontal conveyor (8) associated with each storage plane (5) for moving the load-carriers (6) in the storage planes (5) in the direction of the vertical conveyors (3, 4),
   wherein a control unit (18) is provided,
   said control unit adapted to control the horizontal circuit storage system (1) so that two of the at least three storage planes (5a, 5b; 5c, 5d) and both of the vertical conveyors (3, 4) are each driven in pairs in opposite directions to form a horizontal circuit (65) for the load-carriers (6) across the two storage planes (5a, 5b; 5c, 5d) and the vertical conveyors (3, 4).

2. Horizontal circuit storage system (1) according to claim 1, wherein the storage planes (5) are formed so as to be driven independently of one another.

3. Horizontal circuit storage system (1) according to claim 2, wherein at least one separate horizontal drive (8c) is associated with each pair of said storage planes (5).

4. Horizontal circuit storage system (1) according to claim 1, wherein the horizontal conveyor (3) comprises a circulating traction drive (8a), each span of which is associated with a storage plane (5) of the pair.

5. Horizontal circuit storage system (1) according to claim 4, wherein the circulating traction drive (8a) is arranged between the storage planes (5) of the at least one pair.

6. Horizontal circuit storage system (1) according to claim 5, wherein an upper storage plane of the at least one pair is arranged above the horizontal conveyor (3) associated with it, and the lower storage plane (5) of the at least one pair is arranged below the horizontal conveyor (3) associated with it.

7. Horizontal circuit storage system (1) according to claim 5, wherein the drives (8c, 15, 60b) are arranged commonly on a side surface of the horizontal circuit storage system (1).

8. Horizontal circuit storage system (1) according to claim 1, wherein the storage planes (5) are formed by a rail system (7) and the load-carriers (6) of a storage plane (5) are supported on the rail system (7) so as to be movable horizontally.

9. Horizontal circuit storage system (1) according to claim 1, wherein the number of load-carriers (6) in the horizontal circuit storage system (1) is maximum N+n, wherein N is the number of load-carriers (6) when the storage zone (2) is fully loaded and n is the number of said vertical conveyors (3, 4).

10. Horizontal circuit storage system (1) according to claim 1, wherein each of the vertical conveyors (3, 4) has a plurality of stacked transport planes.

11. Horizontal circuit storage system (1) according to claim 10, wherein vertical conveyors (3, 4) have a rail system (10) on which said load-carriers (6) conveyed by the vertical conveyors (3, 4) are supported.

12. Horizontal circuit storage system (1) according to claim 11, wherein each of the vertical conveyors (3, 4) comprises at least one traction drive (14) to which rails of the rail system (10) of the vertical conveyor (3, 4) are attached.

13. Horizontal circuit storage system (1) according to claim 11, wherein each rail of the rail system (7) of the vertical conveyor (3, 4) is supported by at least one roller (16) running vertically on a support surface (17) in an area overlapping the storage zone (2).

14. Horizontal circuit storage system (1) according to claim 10, wherein the distance (12) between the stacked transport planes corresponds to the distance between the storage planes (5).

15. Horizontal circuit storage system (1) according to claim 10, wherein the stacked transport planes of a vertical conveyor (3, 4) are fixedly coupled to one another with respect to movement.

16. Horizontal circuit storage system (1) according to claim 1, wherein the number of storage planes (5) is less than the maximum number of load-carriers (6) that can be held in a storage plane (5).

17. Horizontal circuit storage system (1) according to claim 1, wherein the horizontal conveyors (8) have drivers (8d) that are adapted to be vertically driven into and out of driver couplings (81) on the load-carrier side.

18. Horizontal circuit storage system (1) according to claim 17, wherein a pair of said drivers (8d) is associated with each said load-carrier (6).

19. Horizontal circuit storage system (1) according to claim 17, wherein each of the load carriers (6) is provided, on its faces facing towards the vertical conveyors (3, 4), with at least one said driver coupling (81).

20. Horizontal circuit storage system (1) according to claim 17, wherein in areas of the storage planes (5) adjacent to the vertical conveyors (3, 4), one said driver (8d) is held in the driver couplings (81) facing away from the adjacent vertical conveyor (4).

21. Horizontal circuit storage system (1) according to claim 1, wherein a locking means (34b) is provided on at least one supporting surface (34) supporting the load-carriers (6) in the vertical conveyor (4), the locking means being adapted to repeatedly engage in a counter-locking means on the load-carrier side.

22. Horizontal circuit storage system (1) according to claim 21, wherein the locking means (34b) is formed as a projection, and the counter-locking means is formed as a roller (80) or a sliding lock.

23. Method for accessing a load-carrier (6) of a horizontal circuit storage system (1), the load-carrier being selected to deliver storage goods held therein, the method comprising the steps of,
   moving the load-carriers (6), for loading or unloading, one behind the other in at least three stacked storage planes (5),
   conveying the load-carrier (6b) selected to deliver storage goods to a delivery station (60) by a vertical conveyor (3), and
   forming a horizontal circuit of load-carriers (6) by two of the at least three stacked storage planes (5a, 5b; 5c, 5d) of the storage zone (2), by circulating the load-carriers (6) essentially horizontally through the two storage planes (5a, 5b; 5c, 5d) in an opposite direction, respectively, and essentially vertically in opposite directions at the two ends of the storage planes, until the vertical conveyor can access the load-carrier selected to deliver the storage goods.

24. Method according to claim 23, further including the steps of circulating the load-carriers (6) in the horizontal circuit (65) while providing a load-carrier (6a) at the delivery station (60).

25. Method according to claim 23, further including the step of after the transport to the delivery station (60) of the load-carrier (6b) that is selected to deliver the storage goods, forming a new horizontal circuit (65), and feeding the previously supplied load-carrier (6a) into said new horizontal circuit.

26. Method according to claim 23, further including the step of forming the new horizontal circuit (65) by two storage planes (5a, 5b; 5c, 5d), one lying directly above the other.

27. Method according to claim 23, further including the step of operating each of the vertical conveyors essentially without a reverse in movement throughout the new horizontal circuit (65).

28. Method according to claim 23, wherein the horizontal circuit is formed through two adjacent said storage planes (5).

29. Horizontal circuit storage system (1) according to claim 14, wherein the stacked transport planes of a one said vertical conveyor (3, 4) are fixedly coupled to one another with respect to movement.

30. Horizontal circuit storage system (1) according to claim 18, wherein each of the load-carriers (6) is provided, on its faces facing towards the vertical conveyors (3, 4), with at least one said driver coupling (81).

31. Method according to claim 24, further including the step of after the transport to the delivery station (60) of the load-carrier (6b) that is selected to deliver the storage goods, forming a new horizontal circuit (65) into which the previously supplied load-carrier (6a) is fed.

* * * * *

UNITED STATES PATENT AND TRADEMARK OFFICE
CERTIFICATE OF CORRECTION

PATENT NO. : 8,818,550 B2
APPLICATION NO. : 11/992501
DATED : August 26, 2014
INVENTOR(S) : Werener Zumbrunn et al.

Page 1 of 1

It is certified that error appears in the above-identified patent and that said Letters Patent is hereby corrected as shown below:

In the Specification

Column 14, Line 20: Delete "dryer", and substitute --driver--.

Column 15, Line 24: Delete "river", and substitute --driver--.

In the Claims

Column 20, Line 7 (Claim 23): Delete "the" (first occurrence).

Column 20, Line 31 (Claim 29): Delete "a".

Signed and Sealed this
Ninth Day of December, 2014

Michelle K. Lee
*Deputy Director of the United States Patent and Trademark Office*